United States Patent
Lewis et al.

(10) Patent No.: US 10,733,617 B2
(45) Date of Patent: *Aug. 4, 2020

(54) AUTOMATIC SEQUENTIAL REVIEW ELICITATION

(71) Applicant: eBay Inc., San Jose, CA (US)

(72) Inventors: Alan Lewis, Santa Clara, CA (US); Rolf Skyberg, Campbell, CA (US)

(73) Assignee: eBay, Inc., San Jose, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 15/784,649

(22) Filed: Oct. 16, 2017

(65) Prior Publication Data

US 2018/0040000 A1    Feb. 8, 2018

Related U.S. Application Data

(63) Continuation of application No. 12/207,426, filed on Sep. 9, 2008, now Pat. No. 9,792,615.

(51) Int. Cl.
*G06Q 30/02* (2012.01)

(52) U.S. Cl.
CPC ......... *G06Q 30/02* (2013.01); *G06Q 30/0203* (2013.01); *G06Q 30/0217* (2013.01); *G06Q 30/0282* (2013.01)

(58) Field of Classification Search
None
See application file for complete search history.

(56) References Cited

U.S. PATENT DOCUMENTS

| | | |
|---|---|---|
| 5,377,355 A | 12/1994 | Hager et al. |
| 6,963,848 B1 | 11/2005 | Brinkerhoff |
| 7,162,433 B1 | 1/2007 | Foroutan |
| 7,346,858 B1 | 3/2008 | Berg et al. |
| 7,620,651 B2 | 11/2009 | Chea et al. |
| 7,697,791 B1 | 4/2010 | Chan et al. |
| 8,554,601 B1 | 10/2013 | Marsh et al. |
| 9,792,615 B2 | 10/2017 | Lewis et al. |
| 2001/0047290 A1 | 11/2001 | Petras et al. |
| 2004/0091847 A1 | 5/2004 | Creamer |

(Continued)

FOREIGN PATENT DOCUMENTS

WO    2010030684 A1    3/2010

OTHER PUBLICATIONS

U.S. Appl. No. 12/207,426, Examiner Interview Summary dated Jan. 23, 2015, 3 pgs.

(Continued)

*Primary Examiner* — Stephanie Z Delich
(74) *Attorney, Agent, or Firm* — Schwegman Lundberg & Woessner, P.A.

(57) ABSTRACT

Some embodiments may provide a method and a system for receiving, from a first user, a first evaluation indication with respect to a first publication, and in response to receiving the first evaluation indication, automatically initiating a secondary evaluation process comprising automatically selecting a set of publications including at least a second publication; presenting a first user interface affordance to elicit a selection indication indicating a publication from among the set of publications, receiving a selection indication indicating the second publication, and in response to receiving the selection indication, presenting a second user interface affordance to elicit a second evaluation indication with respect to the second publication.

17 Claims, 16 Drawing Sheets

(56) References Cited

U.S. PATENT DOCUMENTS

| | | |
|---|---|---|
| 2006/0143066 A1 | 6/2006 | Calabria |
| 2007/0005437 A1 | 1/2007 | Stoppelman |
| 2007/0204001 A1 | 8/2007 | Hoopes et al. |
| 2008/0154698 A1 | 6/2008 | Flake et al. |
| 2008/0154719 A1 | 6/2008 | Gounares et al. |
| 2008/0319870 A1 | 12/2008 | Ranjitkumar et al. |
| 2010/0063864 A1 | 3/2010 | Lewis et al. |

OTHER PUBLICATIONS

European Patent Application No. 09813549.4—EP Extended Search Report dated Oct. 6, 2011, 10 pgs.
U.S. Appl. No. 12/207,426, Examiner Interview Summary dated Aug. 22, 2014, 3 pgs.
U.S. Appl. No. 12/207,426, Final Office Action dated Jan. 27, 2012, 20 pgs.
U.S. Appl. No. 12/207,426, Final Office Action dated Jun. 24, 2015, 35 pgs.
U.S. Appl. No. 12/207,426, Non Final Office Action dated Apr. 21, 2014, 25 pgs.
U.S. Appl. No. 12/207,426, Non Final Office Action dated Aug. 3, 2011, 20 pgs.
U.S. Appl. No. 12/207,426, Non Final Office Action dated Oct. 31, 2016, 33 pgs.
U.S. Appl. No. 12/207,426, Non Final Office Action dated Nov. 24, 2014, 27 pgs.
International Application Serial No. PCT/US2009/056381, Search Report dated Nov. 2, 2009, 2 pgs.
International Application Serial No. PCT/US2009/056381, Written Opinion dated Nov. 2, 2009, 6 pgs.
Chen, Whei-Jen, et al., "XML database design", DB2 9 pureXML Guide, (Jan. 23, 2007), 39-47.
Gundavaram, Shishir, "4. Forms and CGI", CGI Programming on the World Wide Web, Retrieved from the Internet: URL:< http://www.oreilly.com/openbook/cgi/ch04_01.html > [retrieved on May 6, 2015], (Mar. 1, 1996).
International Application Serial No. PCT/US2009/056381, International Preliminary Report on Patentability dated Mar. 24, 2011, 8 pgs.
U.S. Appl. No. 12/207,426, Notice of Allowance dated Jun. 12, 2017, 20 pgs.
U.S. Appl. No. 12/207,426, Response filed Feb. 24, 2015 to Non Final Office Action dated Nov. 24, 2014, 26 pgs.
U.S. Appl. No. 12/207,426, Response filed Feb. 27, 2017 to Non Final Office Action dated Oct. 31, 2016, 33 pgs.
U.S. Appl. No. 12/207,426, Response filed Jun. 27, 2012 to Final Office Action dated Jan. 27, 2012, 15 pgs.
U.S. Appl. No. 12/207,426, Response filed Aug. 21, 2014 to Non Final Office Action dated Apr. 21, 2014, 13 pgs.
U.S. Appl. No. 12/207,426, Response filed Dec. 1, 2011 to Non Final Office Action dated Aug. 3, 2011, 11 pgs.
U.S. Appl. No. 12/207,426, Response filed Dec. 23, 2015 to Final Office Action dated Jun. 24, 2015, 38 pgs.
Australian Application Serial No. 2011100343, Examiner Report dated May 24, 2011, 3 pgs.
Australian Application Serial No. 2011100343, Examiner's Second Report dated Nov. 25, 2011, 2 pgs.
Australian Application Serial No. 2011100343, Response filed Nov. 21, 2011 to Examiner's Report dated May 24, 2011, 41 pgs.
Australian Application Serial No. 2011101538, Examiner's First Report dated Dec. 12, 2011, 2 pgs.
Australian Application Serial No. 2011101538, Response filed Feb. 27, 2012 to Examiner's First Report dated Dec. 12, 2011, 10 pgs.
European Application Serial No. 09813549.4, Communication pursuant to Rules 161(2) dated Apr. 19, 2011, 2 pgs.
European Application Serial No. 09813549.4, Communication pursuant to Rules 70(2) and 70a(2) dated Oct. 25, 2011, 1 pg.
European Application Serial No. 09813549.4, Office Action dated Jul. 24, 2012, 10 pgs.
European Application Serial No. 09813549.4, Response filed Apr. 10, 2012 to Search Report dated Oct. 6, 2011, 14 pgs.
European Application Serial No. 09813549.4, Response filed May 3, 2011 to Communication pursuant to Rules 161(2) dated Apr. 19, 2011, 11 pgs.
European Application Serial No. 09813549.4, Response filed Nov. 16, 2012 to Office Action dated Jul. 24, 2012, 15 pgs.
European Application Serial No. 09813549.4, Summons to Attend Oral Proceedings mailed Jun. 16, 2015, 15 pgs.
EPO, "Notice from the European Patent Office dated Oct. 1, 2007 concerning Business Methods", vol. 30, No. 11, Nov. 1, 2007, pp. 592-593.

AUTOMATIC SEQUENTIAL REVIEW ELICITATION

CLAIM OF PRIORITY

This application is a continuation of U.S. application Ser. No. 12/207,426, filed Sep. 9, 2008, which is hereby incorporated by reference in its entirety.

TECHNICAL FIELD

The present application relates generally to the technical field of methods and systems to perform data processing, and more specifically, receiving user feedback related to publications.

BACKGROUND

In recent years, the Internet has made a wide variety of electronic documents, data, product descriptions, and other publications available to many millions of users. While some internet sites solely include content that is authored by site administrators or other persons under the supervision of site managers, many other Internet sites and other services provide facilities by which members of the public at large can author content for presentation on a web site. For example, network-based marketplaces and other network-based publication systems in which users can post publications describing items for sale. Another example is that of a network-based marketplace in which users can author responses, comments, or other editorial matter related to products or services offered by the marketplace.

Since the quality or usefulness of user-authored material can vary widely, many web sites that include user-authored material may include a user interface by which a user can provide feedback to site administrators on the quality of user-authored material, such as a qualitative or quantitative rating, or a flag that the material is improper in some way. In this manner, such user feedback on user-authored material can provide a degree of community participation in maintaining or evaluating the content of the web site.

BRIEF DESCRIPTION OF THE DRAWINGS

Some embodiments are illustrated by way of example and not limitation in the figures of the accompanying drawings in which.

DETAILED DESCRIPTION

Figure 1:
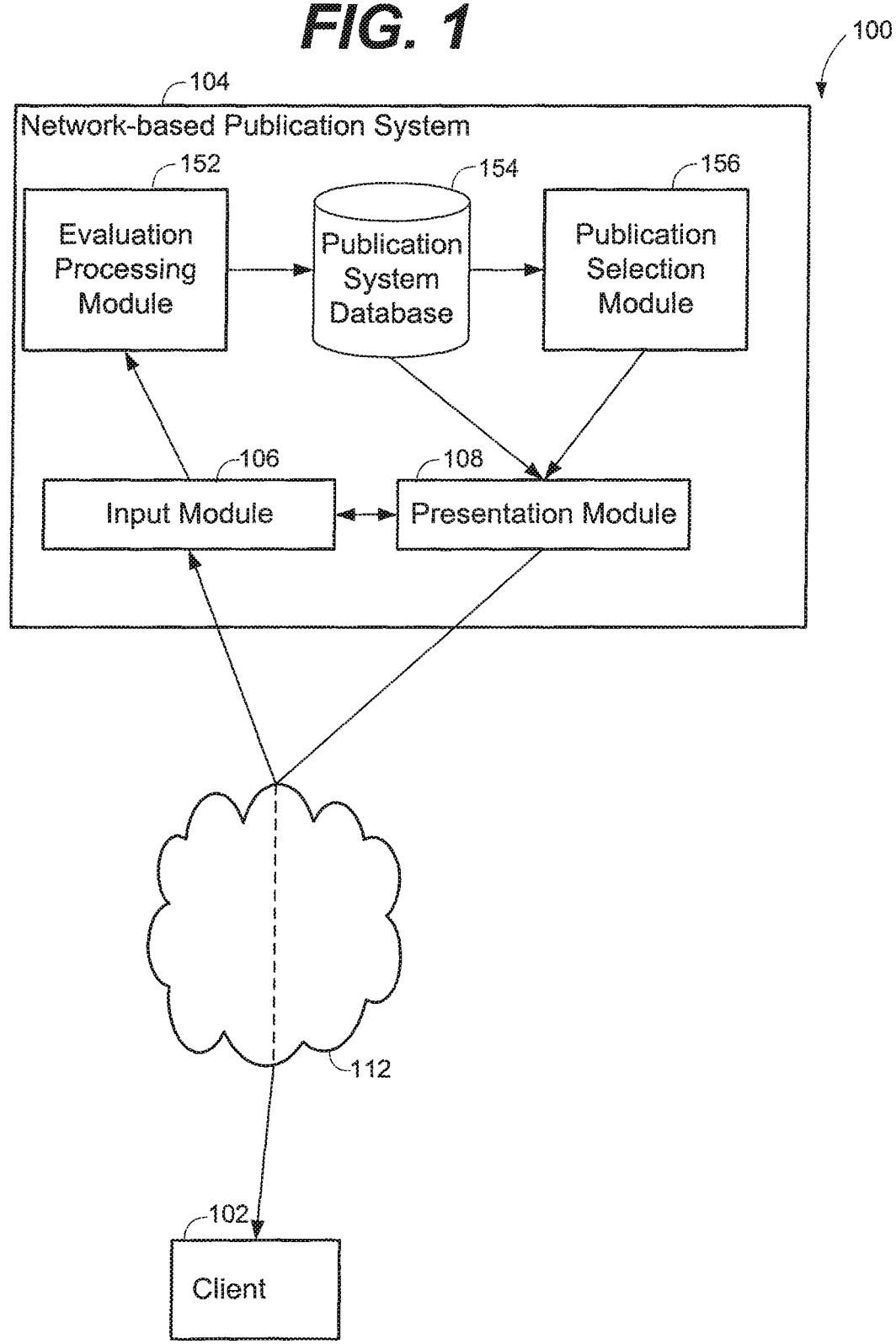
FIG. 1 is a diagrammatic illustration of a system including a network based publication system, according to an example embodiment.

Example methods and systems to facilitate automatic sequential review elicitation are described. In the following description, for purposes of explanation, numerous specific details are set forth in order to provide a thorough understanding of example embodiments. It will be evident, however, to one skilled in the art that the present invention may be practiced in other embodiments without these specific details.

Introduction

When an internet user accesses a web site, the user may encounter various publications such as content authored by site administrators or content authored by other users. Such content may include publications such as articles, descriptions of products for sale, editorial material provided by other users, images, videos, audio or other forms of electronic publication.

When the user encounters such publications, the site may provide a user interface affordance or other mechanism by which a user may review, rate, rank or otherwise comment upon the publication. For example, web sites featuring publications in the form of text authored by users may present a user interface such as a pair of buttons by which a user may evaluate qualitatively or quantitatively whether a text is useful, interesting, or meets certain criteria of quality. By collating or otherwise aggregating input received by one or more users with regard to a particular publication, the web site administrators will be apprised of the quality of a publication.

Once an evaluation indication such as a signal indicating the actuation of a button, checkbox, or other graphical user interface affordance by a user has been received by the site with respect to one publication, the web site may in response automatically initiate a secondary evaluation process. This secondary evaluation process being carried out by the web site may include several operations.

A secondary evaluation process may include having the web site automatically select one or more publications. A user interface may then be presented such as by directing the user web browser to another page displaying a set of publications upon receiving the evaluation indication from the first original publication. This user interface may include user interface affordances to permit the user to select one or more publications from the set of publications selected by the site. Once the web site receives a selection indication from the user such as by the user clicking on an icon or button representing one or more of the set of presented publications, the system may, such as by redirecting a user to yet another web page, present a further user interface affordance to elicit a second evaluation indication with respect to the publication or publications selected by the user.

For example, suppose that a user is visiting a web site that includes publications in the form of web pages describing items for sale. It will be appreciated that in some embodiments web sites may include publications authored by users such as reviews of items or products, editorial, or opinion related text or images or other forms of electronic content.

Suppose for purposes of example that a web site presents a publication in the form of a web page describing a product for sale. This web page may include various user interface affordances such as buttons, checkboxes, text entry fields or other user interface affordances by which a user may submit an evaluation indication such as a review, an opinion, a reading, or other indication. In this example, a user may click on a button presented in conjunction with or as part of the product web page. This review indication may be collected and stored by the web site and the web site may then automatically select three additional product listings, for purposes of example may be called A, B and C.

Simultaneously with this processing, the web site may serve a new web page or other electronic content inviting the user to select one of the publications A, B or C such as may be represented by a title, name, icon, image or other representation of the review or evaluation. In response to the presentation of this second web page, a user may select for example publication B such as by clicking on the icon or hyperlink corresponding to publication B. The web site having received this selection indication, the user's web browser may be redirected to a third web page including publication B and a further user interface by which the user may provide evaluation information with respect to publication B. In some embodiments, this process may repeat to as many cycles of publication selection and publication evaluation indication, elicitation and evaluation submission as the user is willing to carry out.

In some embodiments, a system that stores, maintains, and presents publications may be termed a network based publication system. In some embodiments, a reviewing system which may present user interface affordances for collecting publications for review and receiving evaluation indications may be termed a reviewing system. In some embodiments, a reviewing system may be integrated within the network based publication system while in some other embodiments, the reviewing system may be a separate system from the network based publication system.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or computational object to achieve a particular function, operation, processing, or procedure.

Automatic sequential review elicitation may have several example technical benefits. For example, by carrying out sequential review elicitation, more review information may be gathered in a shorter period of time as compared to single sua sponte reviews submitted by users, permitting a more efficient use of a network-based publication system's data storage facilities by more quickly discovering and removing objectionable publications. Another example technical benefit of automatic sequential review elicitation may include decreased email traffic between users and network-based publication system administrators due to more automation of publication flagging and reviewing, thereby increasing network efficiency in communication between a publication system and its administrators.

Example Systems for Automatic Sequential Review Elicitation

FIG. 1 is a diagrammatic illustration of a system 100 including a network based publication system, according to an example embodiment. The system 100 may include a network based publication system 104 connected through a network 112 such as the Internet to a client system 102 which in some embodiments may be running a web browser or other user presentation software. The network based publication system may include a publication system database 154, an evaluation processing module 152, a publication selection module 156 as well as an input module 106 and a presentation module 108. The input module 106 and presentation module 108 may, in some embodiments, be included in an API server 1314 or a web server 1316 as described in further detail below with regard to FIG. 13. In some embodiments, the client system 102 may correspond to the client machine 1310 or 1312 of FIG. 13. It may include a web client such as a web browser corresponding to client 1306 of FIG. 13.

In some embodiments, the input module 106 may be used to receive requests from the client system 102 for publications as well as for the receiving evaluation indications or selection indications from the client. The presentation module 108 may be used in some embodiments for transmitting publications as well as for transmitting web pages or other electronic content including user interface affordances for selection indication and/or evaluation indication prompting.

The evaluation processing module 152 in some embodiments may be used for processing evaluation indications such as by combining or aggregating evaluation indications from a user of a client system 102 with evaluation indications provided by other users and associating individual aggregate or composite evaluation measurements or data with publications such as by storing such data in a publication system database 154. In some embodiments, a publication selection module 156 may be used to automatically select publications to be offered for evaluation review by the client system 102.

Figure 2:
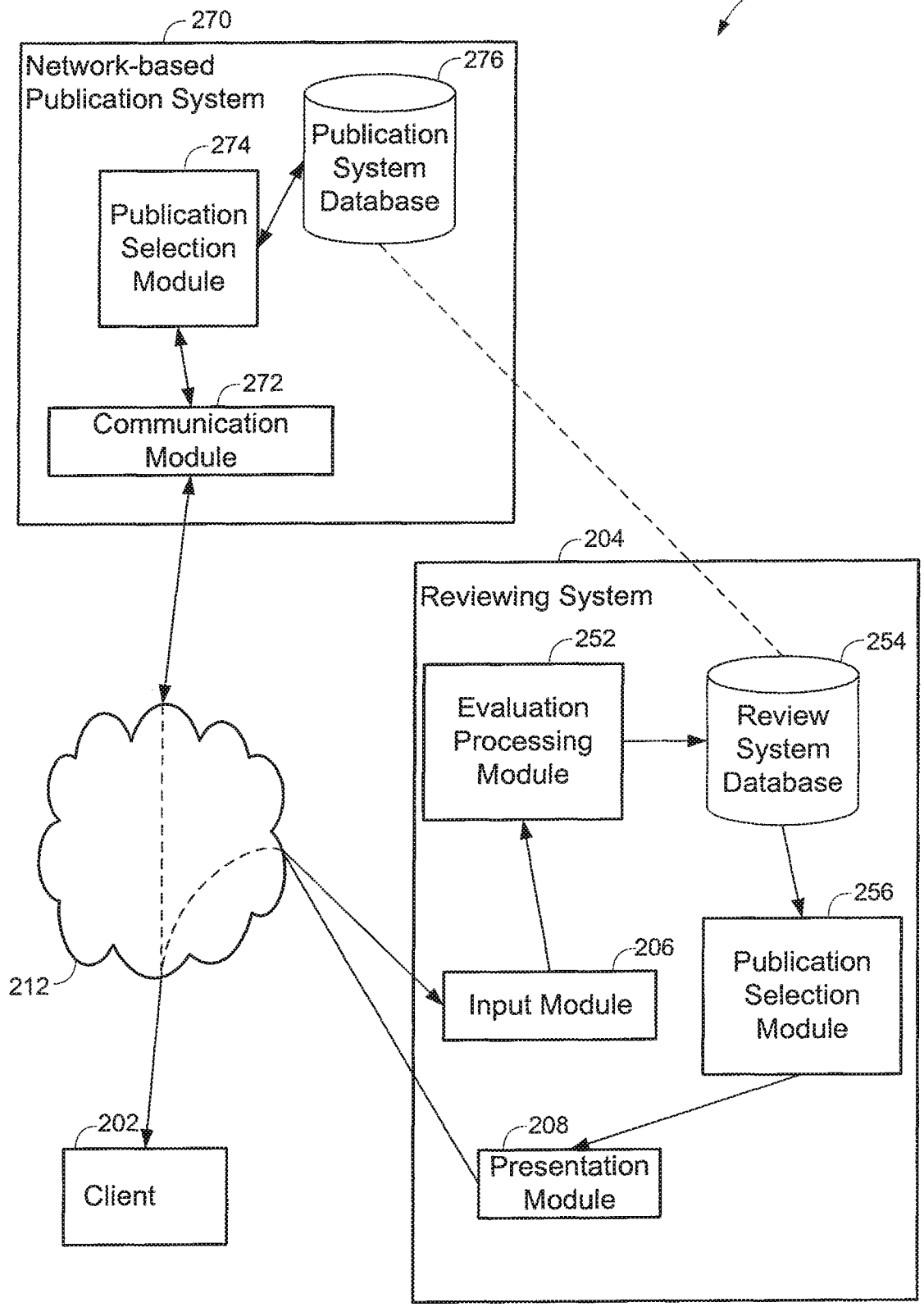
FIG. 2 is a diagrammatic illustration of a further system for automatic sequential review elicitation system, according to an example embodiment.

FIG. 2 is a diagrammatic illustration of a further system for automatic sequential review elicitation system 200, according to an example embodiment. As noted above, in some embodiments, a network based publication system may reside on a separate system server from a reviewing system. For example in some embodiments, the first organization may manage a network based publication system such as an online merchant while a reviewing system may be managed by a reviewing organization and serve as a third party reviewing system for the online merchant.

The system 200 is illustrated as including a communication network 212 such as the Internet by which a client system 202 may communicate with a network based publication system 270 and a reviewing system 204. Network based publication system may include a publication system database 276 which may be used to store publications maintained by and retrievable from the network based publication system 270. Communication module 272 may provide communication services such as a web server or other network interface. Network based publication system 270 may also include a publication selection module by which publications may be retrieved from the publication system data base 276 transmitted to the communication module 272 for transmission to the client system 202. The publication selection module 274 may also be used to receive publication selection information via the communication module during the process of retrieving a requested publication from the publication system database 276.

The system 200 may also include a reviewing system 204 which may include a review system database 254, an evaluation processing module 252, publications selection 256, input module 206 and a presentation module 208. The publication selection module 256, evaluation processing module 252, input module 206 and presentation module 208 in some embodiments correspond to similarly named modules as illustrated in FIG. 1. However, the review system database 254 did not contain the same data as the publication system database 276. The review system database 254 may instead contain evaluation or review data or publications within the publication system database 276 may, in some embodiments, merely include references such as web page, uniform resource locators URLs or publications maintained by the network based publication system 270.

To further disclose how automatic sequential review elicitation system 200 may be used, suppose for purposes of example that the network based publication system 270 stores descriptions of products A, B, C and D as publications in the publication system database 276. Supposed a user client system 202 requests publication A from the network based publication system 270. In response, the network based publication system 270 made may via a communication module 272 transmit a web page including publication A and descriptors for several checkbox affordances by which a rating evaluation may be provided for publication A.

Associated with each checkbox affordance may be a hyperlink such as may comprise a post instruction indicating a web address of reviewing system 204. Thus, when the client system 202 renders the web page including the rating affordances and the publication A, a user of client system 202 may click on one of the rating affordances. In response message may be transmitted from client system 202 to input module 206 within the reviewing system 204 which may include an indication of the user's selected rating of publication A. Thereupon, reviewing system 204 such as via the evaluation processing module 252 may store this review data in the review system database 254 associating the user's selected rating with a reference indicating publication A.

Furthermore, the publication selection module 256 may select additional publications B, C and D referenced in the review system database 254 and by the presentation module 208 serve a web page to the client system 202 mentioning these publications and eliciting a selection. In response, the user at client system 202 may click on an affordance to, for example, select publication C thereby transmitting a selection indication to reviewing system 204. In response, a reviewing system 204 may, for example via the presentation module 208, create a web page including a reference to the publication C by which the publication C may be retrieved from the network based publication system 208 as well as one or more user interface affordances to elicit evaluation indication with respect to publication C. It will be appreciated that by using an automatic sequential review elicitation system such as that illustrated in FIG. 2, the network based publication system 270 need not include mechanisms for evaluation processing or publication selection.

Example Detail Data Structures for Automatic Sequential Review Elicitation

Figure 3:
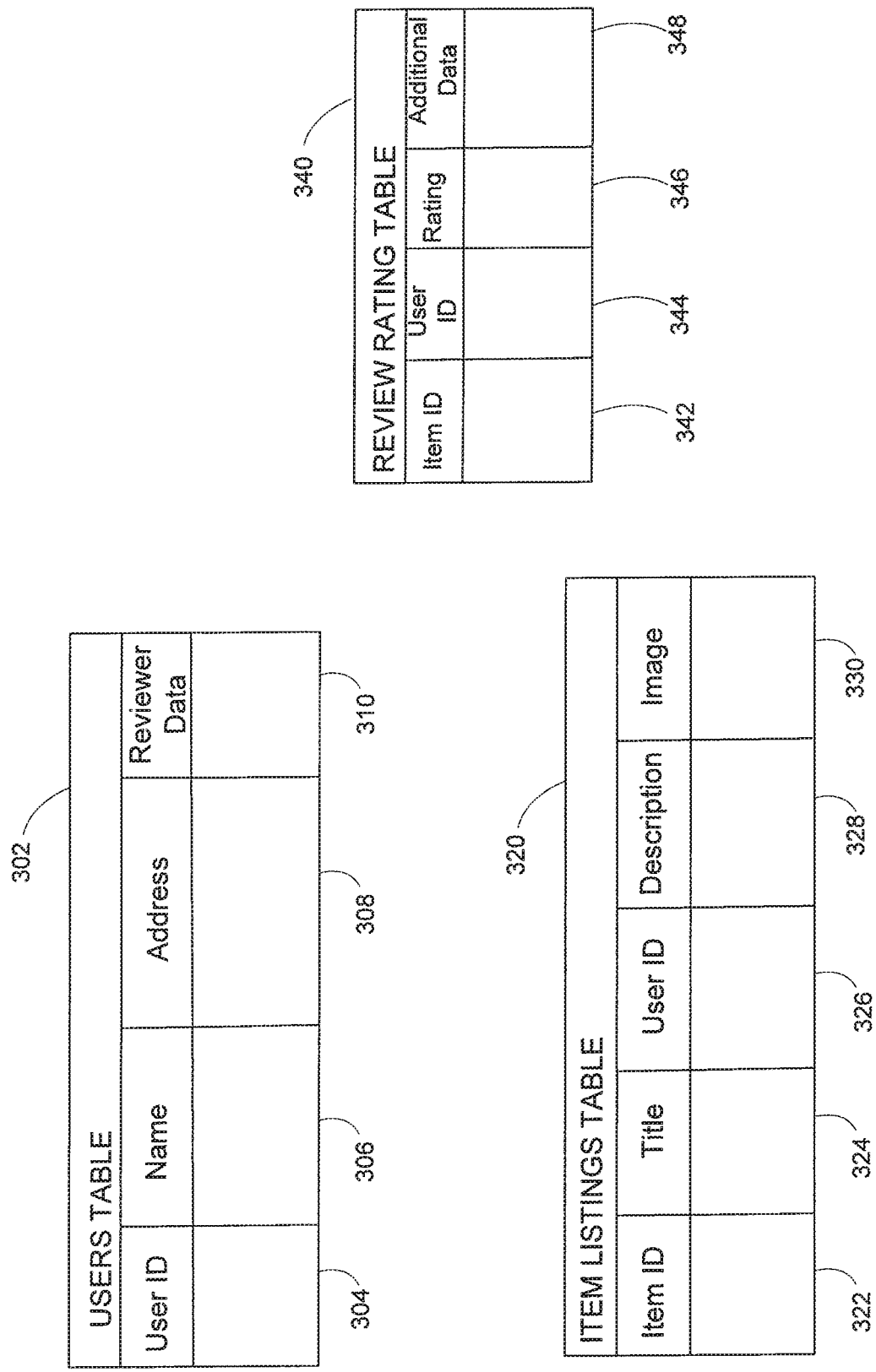
FIG. 3 is a diagrammatic illustration of data structures in the form of several database tables, according to an example embodiment.

FIG. 3 is a diagrammatic illustration of data structures in the form of several database tables, according to an example embodiment. FIG. 3 includes an illustration of a users table 302. The users table 302 may include a user ID column 304, a username 306, a user address 308, reviewer data 310 and other information which may be used to store representations of users of the system. In some embodiments, the user table 1512 described below with respect to FIG. 15 include data such as that shown in users table 302. It will be appreciated that the users listed in the users table need not be limited to individual persons who may in some embodiments represent corporate entities. On the reviewer data in some embodiments information such as credibility indications which may in some embodiments be used for waiting or modifying the use of evaluation indication data as aggregated or compared with evaluation indications provided by other users.

FIG. 3 also illustrates an example review rating table 340. In some embodiments, a review rating table 340 or similar data structure may be used to provide a ternary relationship among viewer's publications such as product or service listings and review data such as evaluation indication data. A review rating table may include an item ID column 342, a user ID column 344, a rating column 346, and an additional data column 348. The rating column may for example be used to store a qualitative or quantitative evaluation indication as provided by a user indicated by a user ID with respect to a publication such as may be indicated by an item ID. The additional data column may include further data such as free form text or other supplemental information that may be associated with or provided in conjunction with an evaluation indication.

FIG. 3 also includes an illustration of an item listings table 320 which may be used to store information about product listings, administrator provided content, user provided content, or other publication items. The item listings table 320 may include an item ID column 322, a title column 324, and a user ID column 326. The user ID column 326 may be used to indicate the user who authored the listing or other publication. A description column 328 may provide a text description as part of the listing or publication. An image column 330 may provide image data for inclusion into an item listing. It will be appreciated that the item ID column 342 and the user ID column 344 of the review rating table 340 may reference the item ID's column 322 with the item listings table 320 and tem the user ID column 304 in the users table 302, respectively.

It will be appreciated that in some embodiments (such as illustrated in FIG. 1) the system may store the data structures as represented by the diagrammatic tables of FIG. 3 in a publication system database 154. In some other embodiments, such as that illustrated in FIG. 2, the data structures in the tables of FIG. 3 may be stored in the review system database 254. In those embodiments, review system database 254 may not include such information as a publication title, publication user ID, publication image or other data. In those embodiments, the listings table may include a reference such as a URL, the publication maintained by the network based publication system 270 and such information as the title, user ID, description, image and the like being stored internally within the network based publication system 270, such as in publication system database 276.

Figure 4:
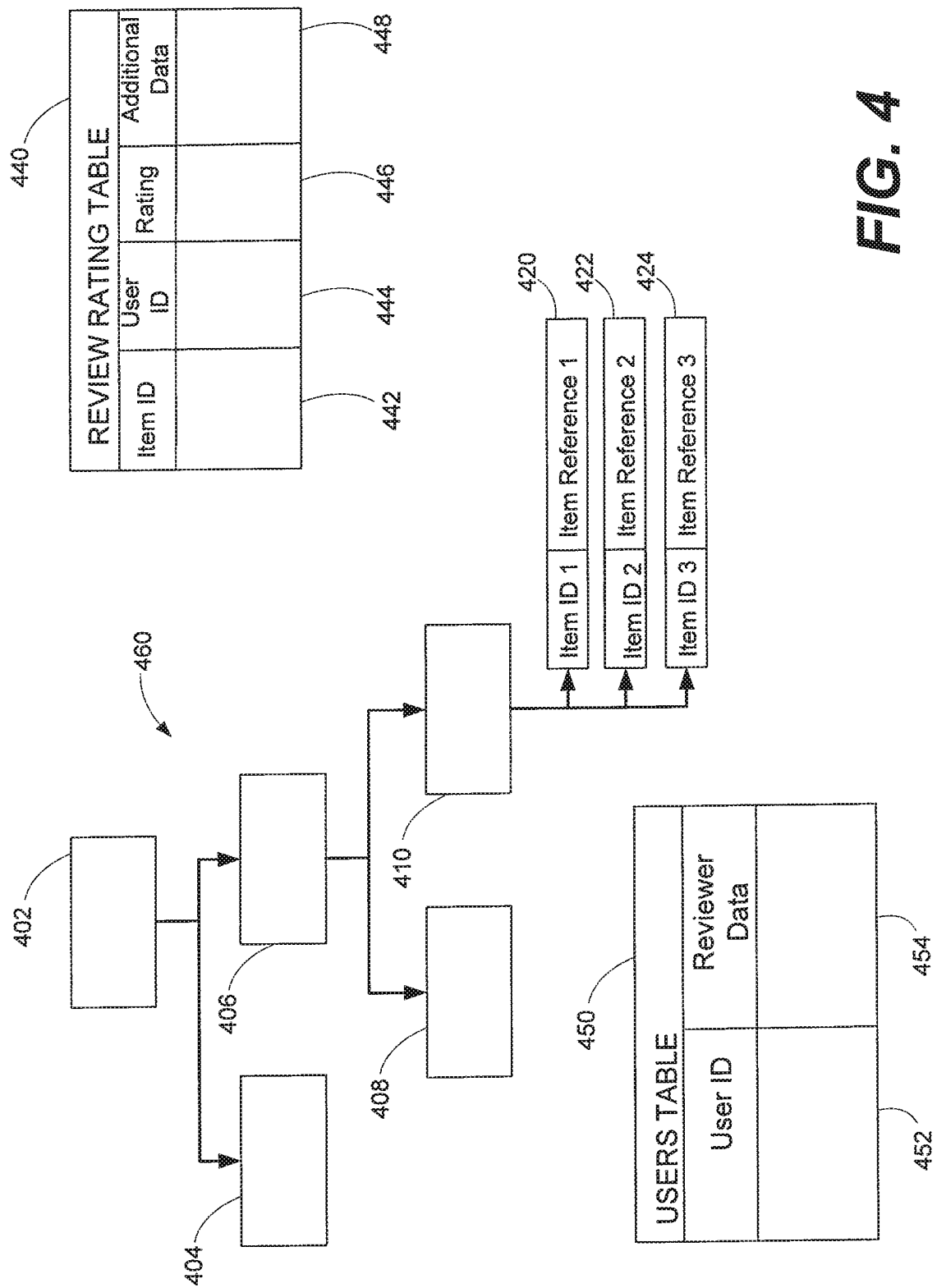
FIG. 4 is a diagrammatic illustration of data structures that may be used within a system for automatic sequential review elicitation such as that shown in FIG. 2 which separate systems or organizations and/or control publication data and a review data.

FIG. 4 illustrates data structures that may be used within a system for automatic sequential review elicitation such as that shown in FIG. 2 in which separate systems or organizations and/or control publication data and a review data. The databases may be linked in some manner as illustrated by the dashed line in FIG. 2.

A reviewing system such as review system 204, in which a reviewing system is separate from a network based publication system may in some embodiments include a review system database 254 that includes data structures such as those illustrate in FIG. 4. A reviewing system 204 may for example include a review rating table 440 that includes an item ID column 442, a user ID column 444, a rating column 446, and an additional data column 448. This review rating table 440 may serve a similar or as that of the review rating table 340 of FIG. 3. In addition, a reviewing system 204 may include users table 450, which may include such data columns as a user ID column 452 and a reviewer data column 454. It will be appreciated in some embodiments, a users table 450 need not store a full set of data relating to users, such as a name, address, phone number or other such data. Such data is maintained by a network based publications system 270.

In some embodiments, a reviewing system 204 may not include a complete data structure exactly mirroring a publications system database 276, maintained by the network based publication 270, for which the reviewing system is serving to collect and/or aggregate review or evaluation data. In some embodiments, a review system database 254 may include a data structure 460. Data structure 460 may in some embodiments be arranged in a tree shaped configuration, providing a similar taxonomy of publications. For example the data structure 460 may include a node 408 and a node 410 which may represent subcategories of publications of a category node 406. The category node 406 and the category node 404 may in turn the subcategory nodes of a category node 402. The data structure 460 category note such as category node 410 may reference one or more item ID or publication ID and item reference or publication reference tuples such as tuples 420, 422 and 424.

In some embodiments, data structure 460 may be built automatically by the reviewing system in response to the publications selected for review by various users such as the user of client system 202. In some embodiments, a data structure such as the structure 460 may be used such as by the publication selection module 256 to identify such as by upward tree traversal publications categorically similar to publications reviewed by a user. In some embodiments, a data structure such as 460 storing data in a review system database 254, about publications in a publication system database 276 may be constructed on the fly by the reviewing system 204. In some other embodiments, the network based publication system 270, may provide an application programming interface API by which a reviewing system 204 may construct a database or other representation of the publication system database 276 for use in processing evaluation indications and selecting additional publications for which review indications are to be elicited.

Example Processes for Automatic Sequential Review Elicitation

Figure 5:
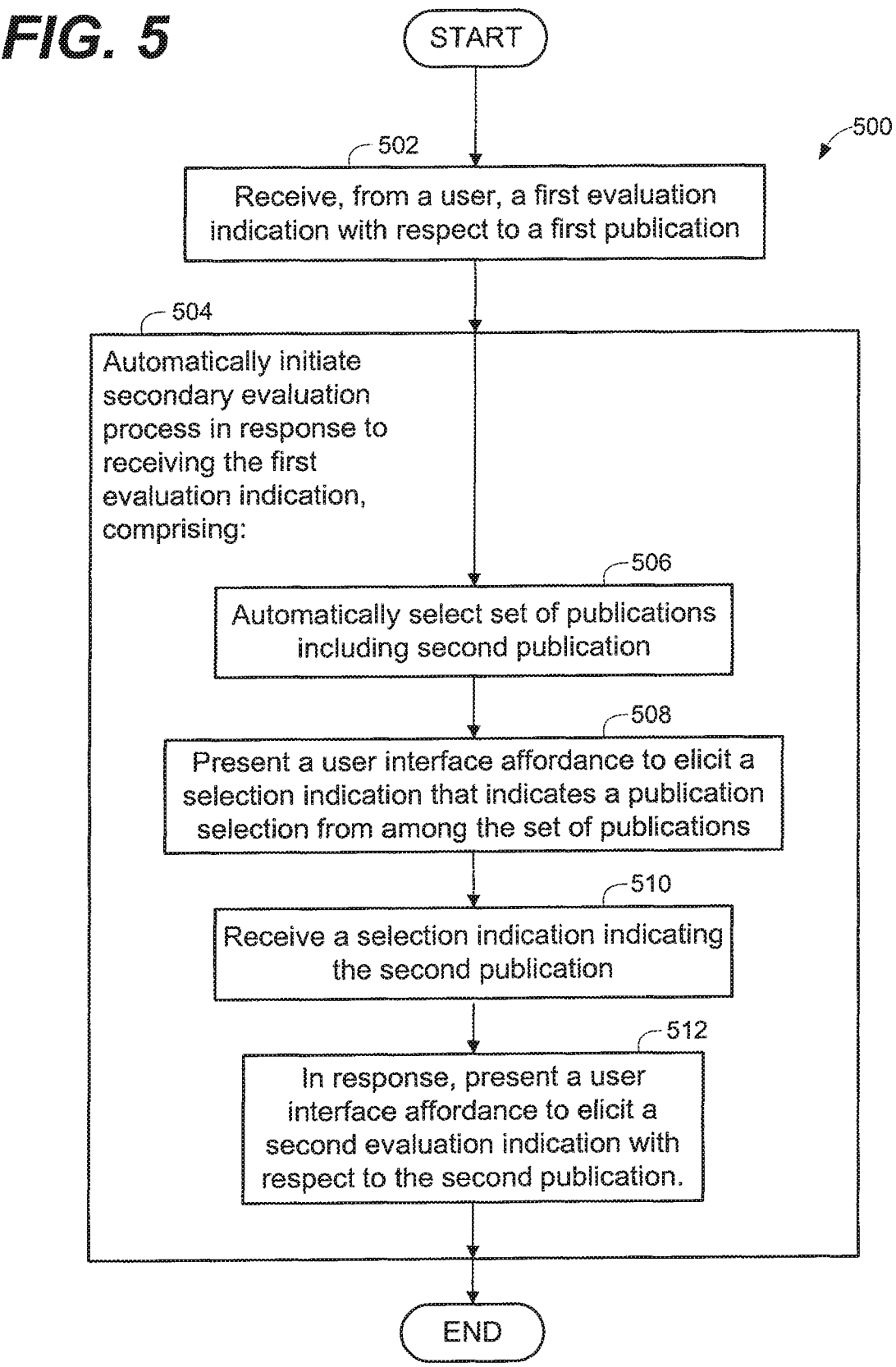
FIG. 5 is a flowchart illustrating a process for receiving evaluation indication from a user and automatically initiating a secondary evaluation process, according to an example embodiment.

FIG. 5 illustrates a flowchart of a process 500 for receiving evaluation indication from a user and automatically initiating a secondary evaluation process, according to an example embodiment. The process 500 as illustrated in FIG. 5 may begin at block 502 in which a first evaluation indication with respect to a first publication may be received from a user. Processing at block 502, in some embodiments may be carried out by the input module 106 or 206. In some embodiments the first evaluation indication is received as a result of the first user interacting with the user interface.

It will be appreciated that in some embodiments, the first evaluation indication may take various forms, for example a category indication in which a user indicates a categorization of the first publication according to some criteria, a quality indication such as a rating or ranking of the quality of the first publication, the characteristic indication such as an indication of some characteristic of the first publication, a review indication expressing a review or editorial opinion or finding as regard to the first publication, free formed text indication in which a user provides a narrative review or evaluation for the first publication in combinations and variations of these evaluation indication types. In some embodiments, the first evaluation indication with respect to a first publication may be received from a user directly or over a network and maybe carried out in response to a user actuating an affordance upon a web page displayed or presented at the user's computer, the actuation triggering a hyper text transfer protocol (HTTP) POST or GET command.

Processing may continue at block 504 which for example a reviewing system 204 or network based publication system 104 may automatically initiate a secondary evaluation process. The secondary evaluation process may be in response to receiving the first evaluation indication and may comprise a number of additional operations.

The secondary evaluation process may continue at block 506 in which a set of publications including a second publication may be automatically selected. In some embodiments, this automatic selection may be carried out by a publication selection module 156 or publication selection module 256. In some embodiments the set of publications may include at least one additional publication in addition to the second publication while in some other embodiments, the set of publications may include only the second publication. The set of publication may be automatically selected based on various criteria such as the content, nature or category of the first publication, a publication viewing history by the user, information on a particular expertise of a user such as a user's expertise in evaluating a particular category or categories of publications or products or items described by those publications, combinations thereof. User expertise information may in some embodiments be stored in a user's table such as in the viewer data column or columns 454 or reviewer data columns or columns 310.

At block 508, the user interface affordance may be presented to a user to elicit a selection indication indicating a publication from among the set of publications selected at block 506. In some embodiments the processing of block 508 may be carried out by the presentation module 108 or 208. For example a web page including abbreviated or iconic representations of the set of publications may be transmitted to the client system 102. Buttons or other user interface affordances may be provided to permit the user to select at one or more of the set of publications.

At block 510, a selection indication indicating a second publication may be received such as by the input module 106 or the input module 206 in some embodiments. In some embodiments multiple selection indications may be received in addition to the selection indication mentioned in block 510.

At block 512, in response to receiving the selection indication indicating a second publication, a user interface affordance to elicit a second evaluation indication with respect to the second publication may be presented. In some embodiments, this presentation of the user interface affordance may be carried out by a presentation module 108 or the presentation module 208. The user interface affordance may include one or more check boxes, radio buttons, clickable buttons, icons, text fields or other user interface elements. It will be appreciated that both the first evaluation indication with respect to the first publication and the second evaluation indication to the second publication elicited at block 510 may be stored such as by evaluation processing module 252 or 152 into the review system database 254 or 154 respectively such as into a review rating table 340 or other data structure.

In some embodiments, the second user interface affordance may be presented separately from the second publication such as in a separate window from the presentation of the second publication or via an email instant message solicitation or other mechanism. In some other embodiments, the second user interface affordance may be presented in conjunction with the second publication such as included in an HTML page rendering of the second publication.

Figure 6:
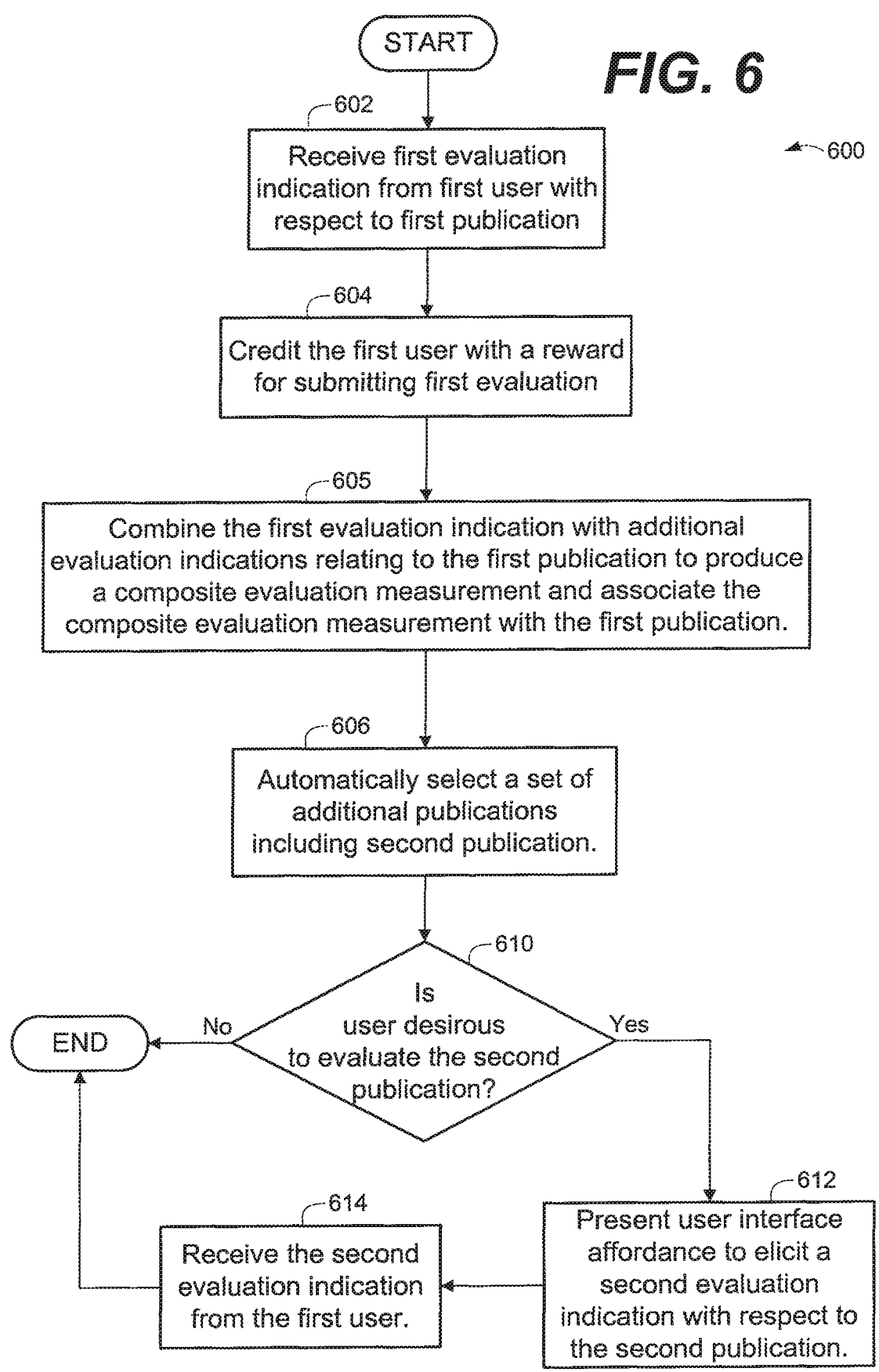
FIG. 6 Illustrates a further process for use in automatic sequential review elicitation, according to an example embodiment.

FIG. 6 illustrates a further process 600 for use in automatic sequential review elicitation, according to an example embodiment. The process 600 may at block 602 in which a first evaluation indication for a first user with respect to a first publication may be received such as by the input module 106. A first evaluation indication may be received subsequent to a user requesting a web page or other representation of a publication that includes a user interface affordance by which a first evaluation indication may be elicited.

At block 604, the first user may be credited with a reward for submitting the first evaluation. The size and quality of this credit may be dependent in some embodiments upon the reputation of the user, the abundance or shortage of evaluations by various users with respect to the first publication, the trustworthiness or reputation of the first user or other criteria. In some embodiments, this crediting may be carried out by the evaluation processing module 152 or evaluation processing module 252.

At block 605, the first evaluation indication may be combined with additional evaluation indications relating to the first publication to produce a composite evaluation measurement and associate the composite evaluation measurement with the first publication. For example, some embodiments in a system administrator may be interested to know a combined or aggregated evaluation measurement based on evaluation indications submitted by several users such as to identify publications infrequently or vigorously reviewed by many users. This combining process may be carried out by the evaluation processing module as may the association of the composite evaluation measurement with the first publication. In some embodiments, the composite evaluation measurement may be stored in an item listing table 320 or in some other data structure maintained by the reviewing system 204 or a network based publication system 104.

At block 606, a set of publication including a second publication may be automatically selected. This selection may be carried out by the publication selection module 156 or 256. As noted above, the set of publications may include only the second publication or multiple publications. In embodiments in which a set of multiple publications are automatically selected it will be appreciated that the identification of which publication is the second publication may be based on the selection indication provided by the first user.

At block 610, an evaluation may be made as to whether the user is desirous to evaluate the second publication. In some embodiments, the outcome of the decision box 610 may be based on whether a user selects one of the set of publications to review. A processing at decision box 610 may in some embodiments be carried out by the evaluation processing module 152 or evaluation processing module 252.

At block 612, a user interface affordance to elicit the second evaluation indication with respect to the second publication may be provided. Presentation of block 612 may be in some embodiments carried out the presentation module 108 or presentation module 208.

At block 614, a second evaluation indication may be received from the first user such as by the input module 106 or the input module 206. At the conclusion of the processing of block 614, the process 600 may end or may continue at block 604 (not shown) in which additional publications may be selected and evaluated by a user. In some embodiments, as a result of receiving the second evaluation indication at block 614, an additional reward may be credited to the first user and the second evaluation indication may be combined with additional evaluation indications relating to the second publication to produce composite evaluation measurement or other aggregated or composited data with respect to the second publication.

Figure 7:
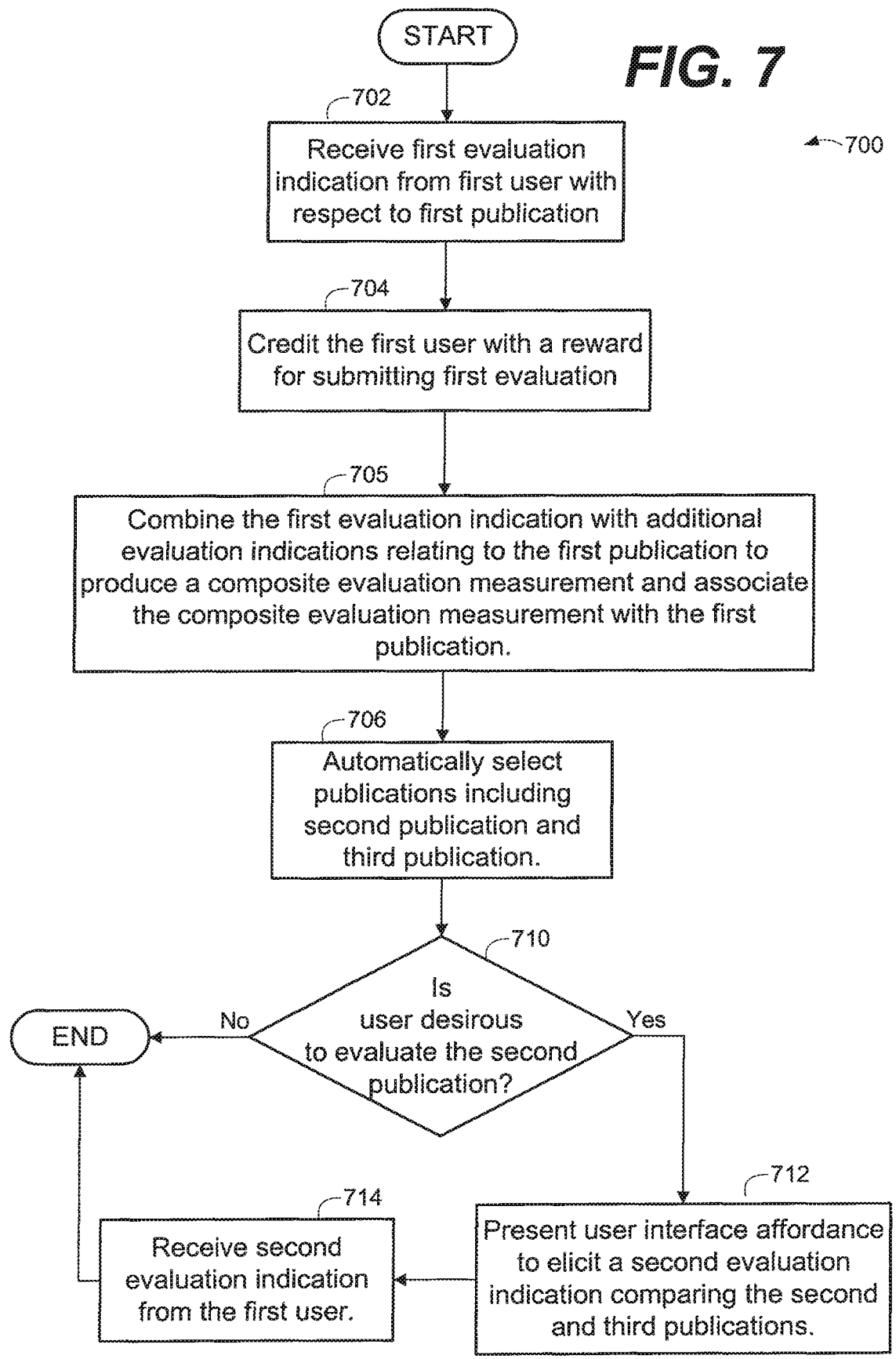
FIG. 7 illustrates a further example process for use in automatic sequential review elicitation, according to an example embodiment.

FIG. 7 illustrates a further alternative example process 700 for use in automatic sequential review elicitation, according to an example embodiment. Process 700 illustrates an alternative process in which the user may evaluate a publication with reference to or by comparison with another publication. Process 700 may begin with processing at block 702 in which the first evaluation indication for a first user with respect to a first publication is received such as by an input module 106. At block 704 in response to receiving the first evaluation indication, the user may be credited with a reward which is by an evaluation processing module 152.

Next, at block 705, the first evaluation indication may be combined with additional evaluation indications from other users to produce a composite evaluation measurement and associate that composite evaluation measurement with the first publication. At block 706, a set of publications may be selected automatically. In some embodiments, a second publication and third publication may be selected such as by the publication selection module 156 and the user may be asked whether the user wishes to provide an evaluation of the second publication in which case the user may be asked to evaluate the second publication by contrast comparison with third publication. In some other embodiments, a set of publications may be selected and the user may be prompted to select one of the publications for evaluation with the publication which is to be compared automatically selected by the publication selection module. In some other embodiments, the set of publications may be selected automatically and a user may be prompted to select two publications from the set and evaluate one publication by contrast or relative to the other.

In various embodiments, a determination may be made at decision box 710 as to whether the user is desirous to evaluate the second publication. For example, by comparison or contrast with the third publication, if not, the process 700 may terminate. If the user is desirous to evaluate the second publication then processing may continue at block 712 in which the user interface affordance is presented to elicit the second evaluation indication comparing the second and third publications. This presentation may in some embodiments be made by the presentation module 108 or the presentation module 208.

Finally, at block 714, the evaluation indication may be received from the first user such as by the input module 106 or input module 206. At this point, the process 700 may terminate or the user may be provided the opportunity to further evaluations (not shown) with respect to further publications considered by themselves or by comparison with other publications. The evaluation indication received at block 714 may subsequently be combined with other evaluation indications with respect to the second publication such as by comparison of the third publication. The first user may be credited with an additional reward in response to the reception of the second evaluation indication received in block 714.

Example User Interfaces for Automatic Sequential Review Elicitation

Figure 8:
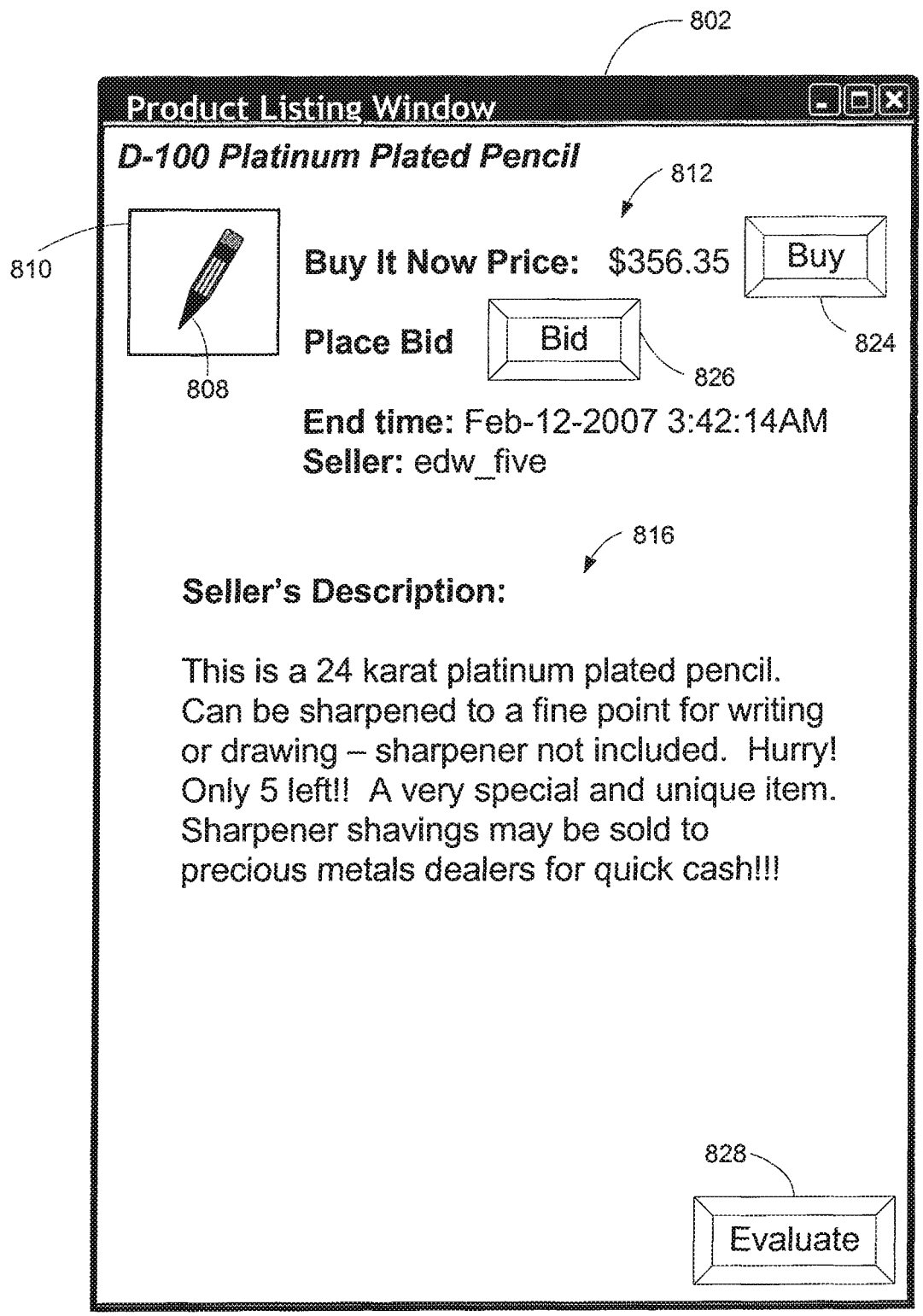
FIGS. 8 through 12 depict a series of user interfaces illustrating an example automatic sequential review elicitation process, according to example embodiments.

FIG. 8 through 12 depict a series of user interfaces illustrating an example automatic sequential review elicitation process, according to example embodiments. FIG. 8 illustrates an example of a publication such as a product listing that may be retrieved from a network-based publication system 104 by a client system 102 and displayed by a web browser or other content display application.

FIG. 8 illustrates a product listing window 802 is shown containing a publication. This publication such as an auction format product listing may include purchase information 812, including a buy button 824, a bid button 826. The publication may also include image area 810 containing an image of the listed product 808. The publication may also include a description 816 of the listed product. Presented in conjunction with the listing in the product listing window 802 may be an evaluate listing button 828 which, when actuated, may transmit a message to the network based publication system 104 or in some embodiments a reviewing system 204 indicating that the user wishes to evaluate, review, or otherwise comment upon the publication illustrated in the product listing window 802.

Figure 9:
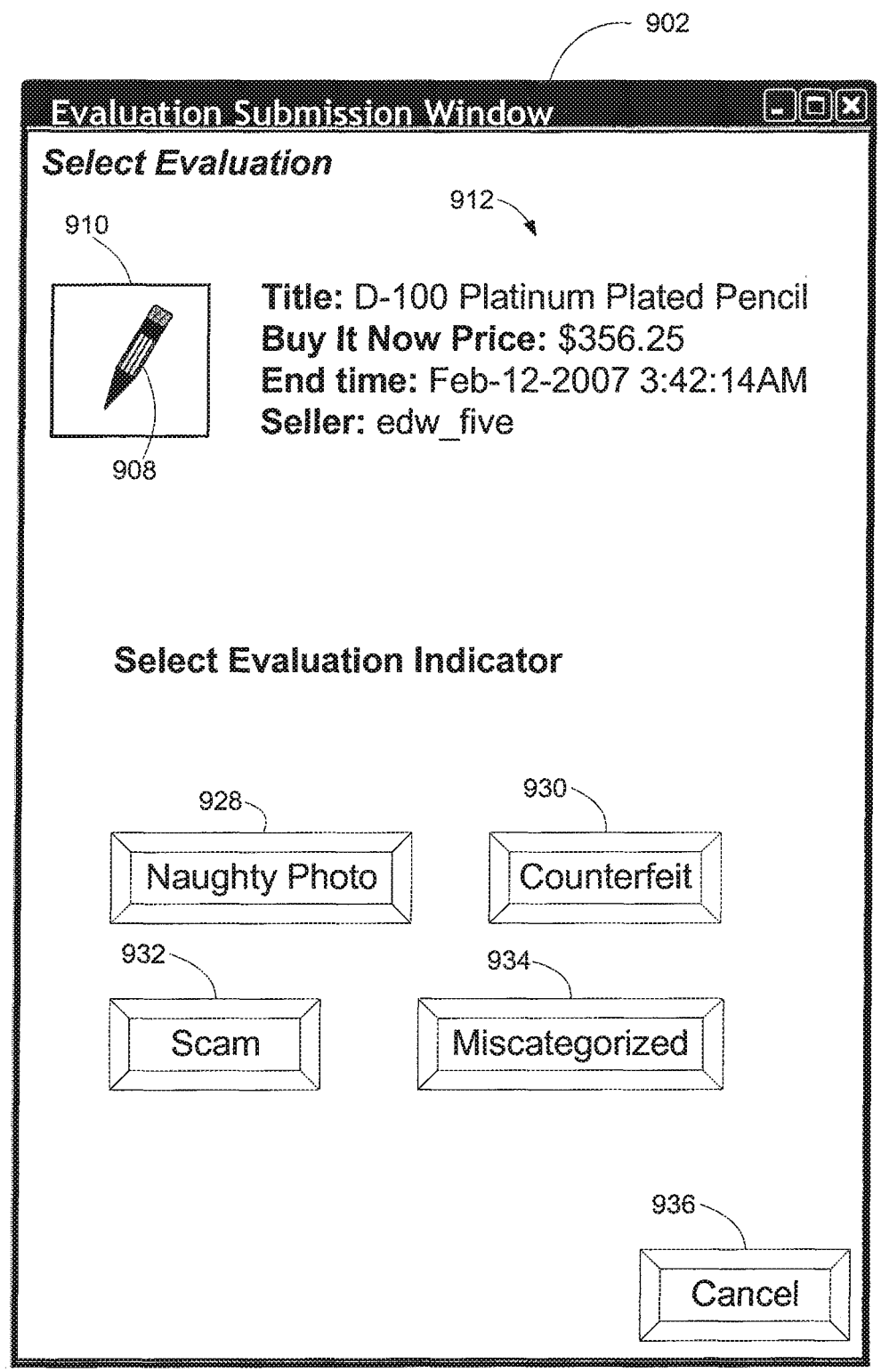

FIG. 9 illustrates an evaluation submission window 902 which may in some embodiments be transmitted by a network-based publication system 104, by a presentation module 108, or a by a network-based reviewing system 204 by a presentation module 208. The evaluation submission window 902 may display a summary 912 of the publication as well as the image area 910 showing an image 908 of the listed product.

The evaluation submission window 902 may also include one or more affordances by which the first evaluation indication may be indicated by the user. For example, the evaluation submission window 902 is shown as including four buttons which may in some embodiments be accompanied by or include iconic representations. These evaluation indicator buttons may include a "naughty photo" button 928, a counterfeit button 930, a scam button 932 and a miscategorized button 934 by which in some embodiments, a user may characterize the publication and/or product or service described by the publication. In addition, evaluation submission window 902 may include a cancel button 936 which may be actuated by the user if the user decides not to submit an evaluation indication.

Figure 10:
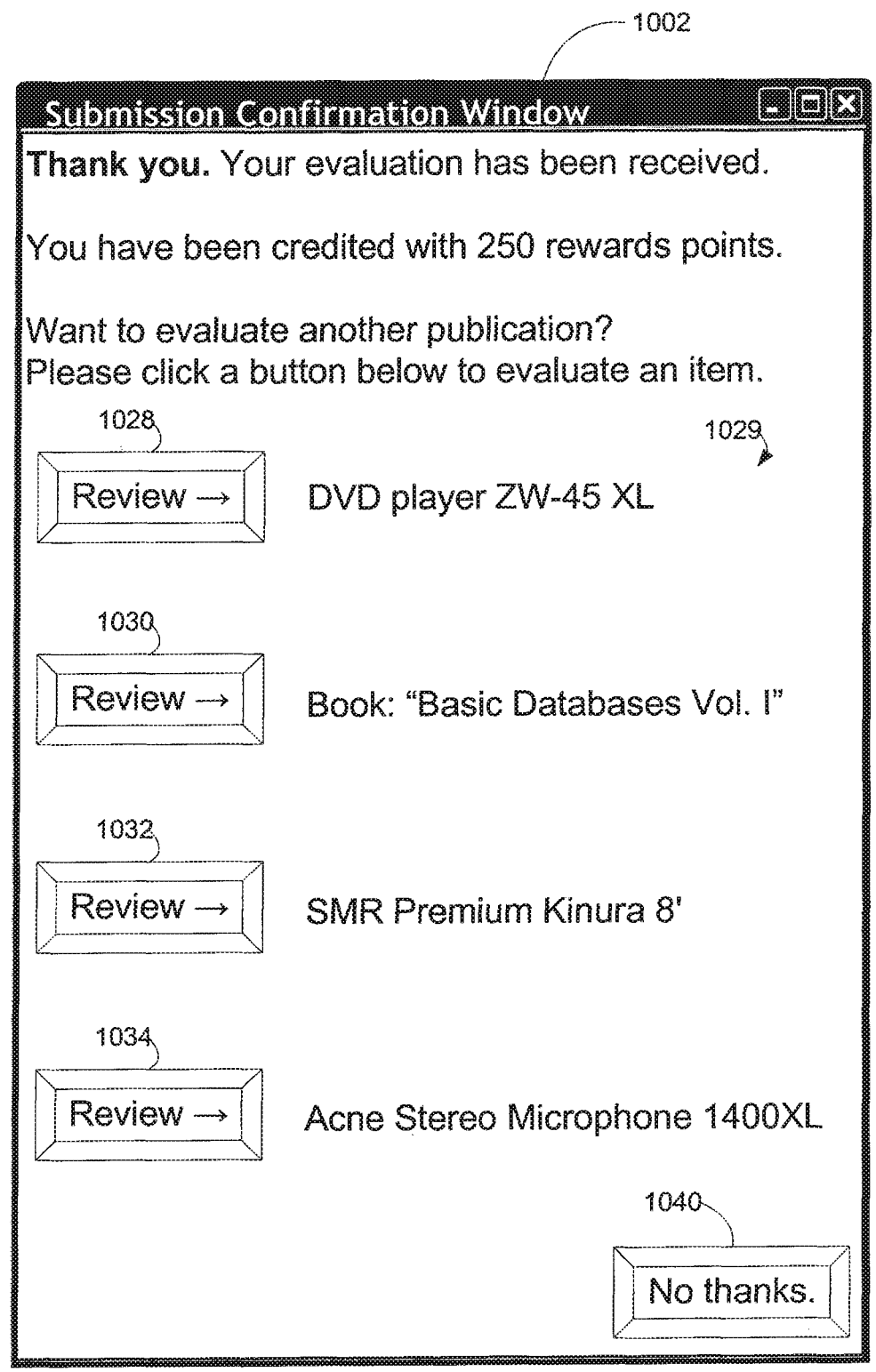

In response to actuating one of the evaluation indicator buttons in evaluation submission window 902, submission confirmation window 1002 as illustrated in FIG. 10 may be presented to the user such as by the presentation module 108 or presentation module 208. The submission confirmation window 1002 may include a list of publications 1029 such as may for example be selected by a publication selection module 156 or publication selection module 256 plus corresponding buttons 1028, 1030, 1032 and 1034 by which a user may select the second publication for evaluation. It will be appreciated that the submission confirmation window 1002 also may include a legend indicating a crediting of a user with a reward such as reward points or in some embodiments, commercial or proprietary currency. Also illustrated in the submission confirmation window 1002 is a "No thanks" button 1040 by which a user may indicate they do not wish to evaluate any of the selected publications summarized by the publication titles 1029.

Figure 11:
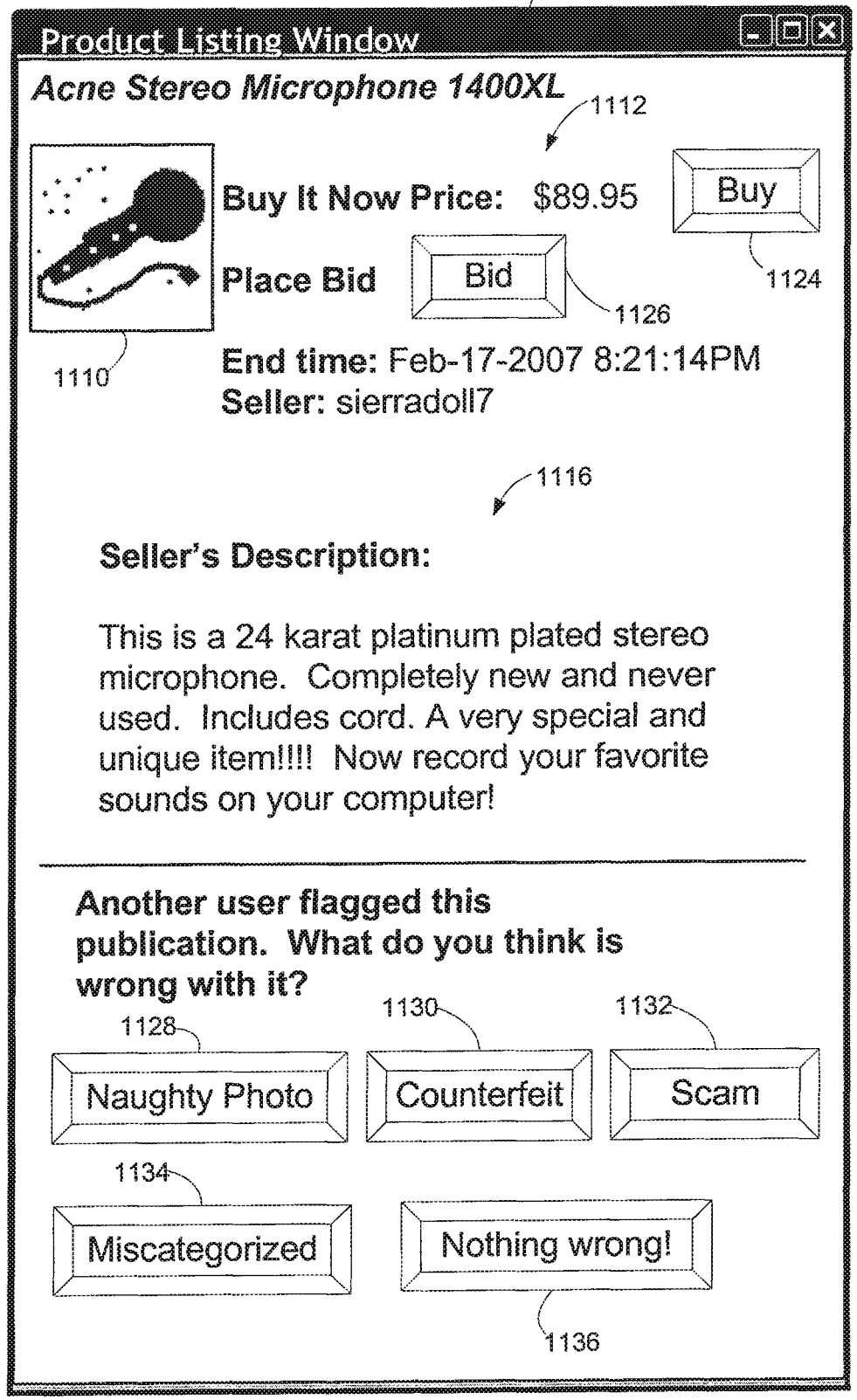

FIG. 11 illustrates a product listing review window review may be presented in response to a user clicking the review button 1034 of FIG. 10. In some embodiments, one or more publications in a set of publications automatically selected such as by a publication selection module 156 or publication module 256 may be selected having them previously evaluated by another user. The product listing review window 1102 may include a product listing purchase summary 1112 including a buy button 1124, a bid button 1126 and a product image area 1110 as well as a description 1116.

In the lower section of the product listing review window review, all user interface affordances may be presented to elicit a review indication of a publication. These review affordances may include a naughty photo button 1128, a counterfeit button 1130, a scam button 1132, and a miscategorized button 1134. In some embodiments, additional buttons may be presented to elicit other quantitative or qualitative evaluations or reviews of a publication or product or service listing.

In addition, if the user disagrees with the previous user's evaluation a nothing wrong button 1136 may be actuated. In some embodiments, another user may have actually provided evaluation indication for the publication while in some other embodiments, a text indicating that a user rating the publication may be presented early to prompt the user to more closely scrutinize and evaluate the publication.

Figure 12:
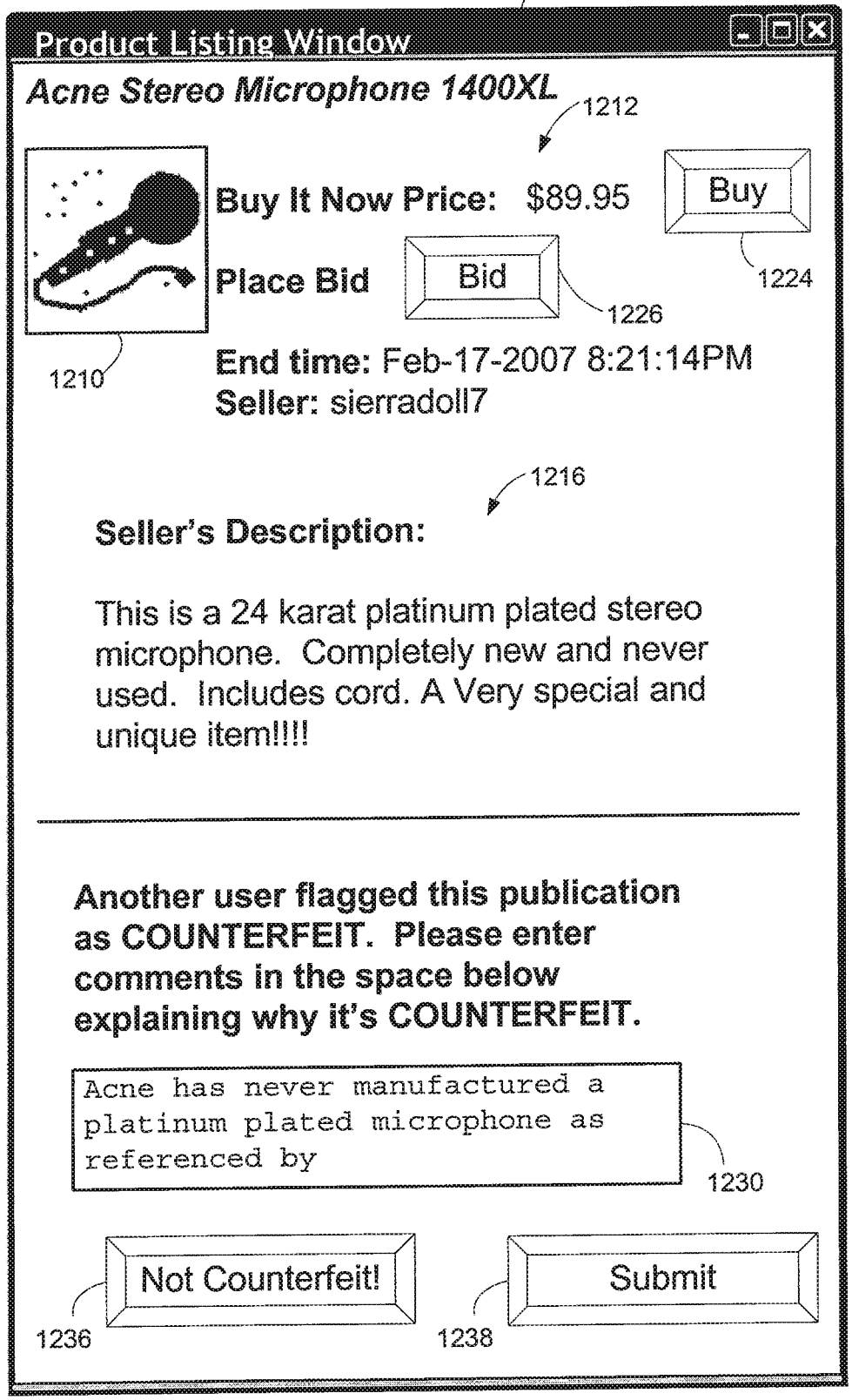

FIG. 12 illustrates an alternate product listing review window 1202 that may be presented to the user in response to a user clicking on the review button 1034 of FIG. 10. Similar to the product listing review window 1102 illustrated in FIG. 11, product listing review window 1202 may include a buying summary 1212, including a buy button 1224, a bid button 1226, a product image area 1210, and a description 1216.

The product listing window 1202 may include a number of user interface elements and affordances for reviewing the listing. For example, a product listing review window 1102 may show a message indicating that another user flagged the publication as containing a counterfeit product. In providing an evaluation indication, user may have the opportunity to enter free form text in a text area 1230 and once complete may click a submit button 1238. Alternatively, the user may click the "Not counterfeit" button 1236 to indicate a disagreement with the purported other user's evaluation of the publication as counterfeit as in FIG. 12. In some embodiments, the legend describing the other user's evaluation may be accurate or intentionally inaccurate to encourage a more thorough scrutinizing and reviewing of the publication or to test the user's evaluation accuracy.

Example Platform Architecture

Figure 13:
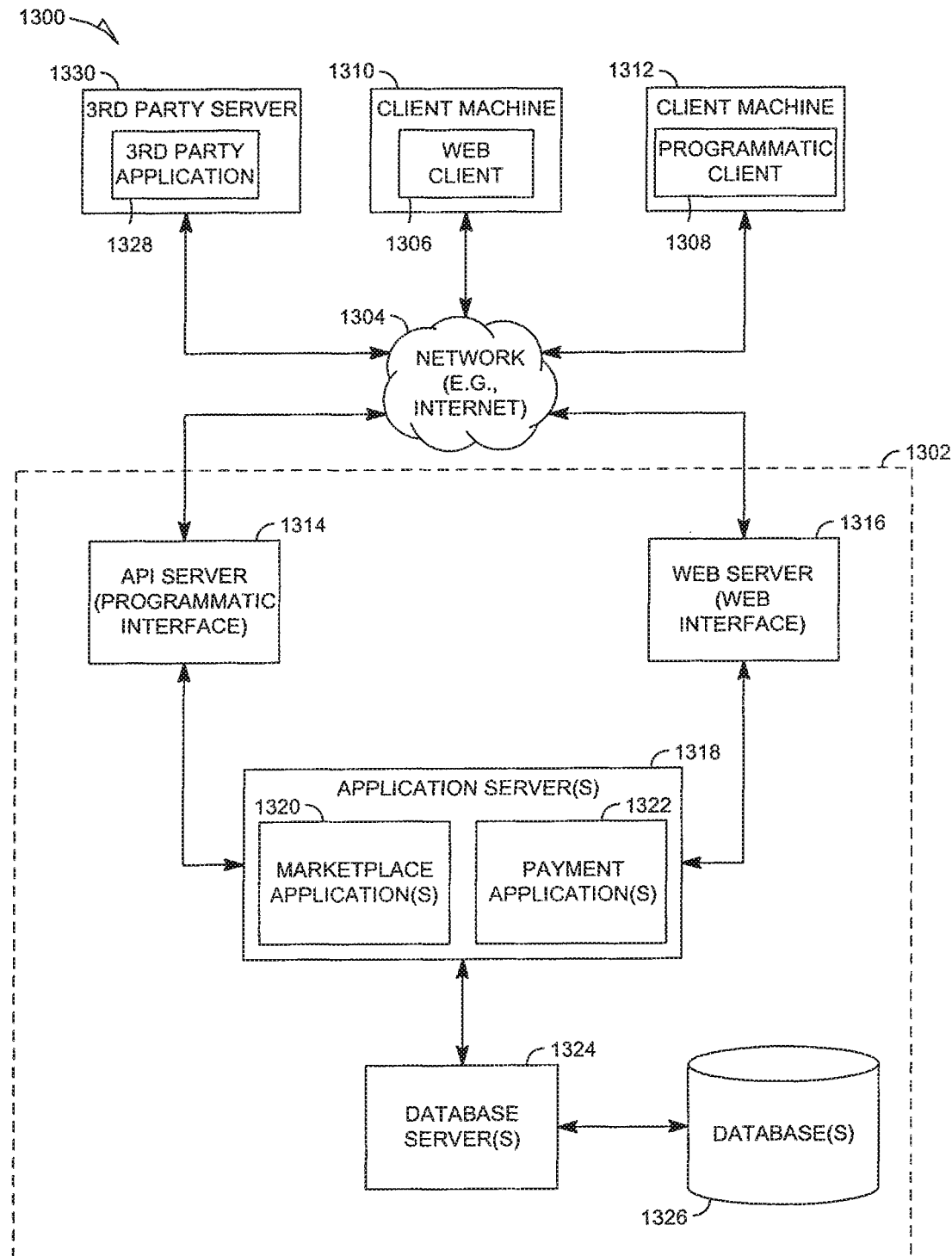
FIG. 13 is a network diagram depicting a client-server system within which one example embodiment may be deployed.

FIG. 13 is a network diagram depicting a client-server system 1300, within which one example embodiment may be deployed. A networked system 1302, in the example forms of a network-based marketplace or publication system, provides server-side functionality, via a network 1304 (e.g., the Internet or Wide Area Network (WAN)) to one or more clients. FIG. 13 illustrates, for example, a web client 1306 (e.g., a browser, such as the Internet Explorer browser developed by Microsoft Corporation of Redmond, Wash. State), and a programmatic client 1308 executing on respective client machines 1310 and 1312.

An Application Program Interface (API) server 1314 and a web server 1316 are coupled to, and provide programmatic and web interfaces respectively to, one or more application servers 1318. The application servers 1318 host one or more marketplace applications 1320 and payment applications 1322. The application servers 1318 are, in turn, shown to be coupled to one or more databases servers 1324 that facilitate access to one or more databases 1326. In some embodiments, the databases in shown as database 164 in FIG. 1, database 254 of FIG. 2, and/or the data structure of FIG. 3 and/or FIG. 4 may be stored in databases 1326.

The marketplace applications 1320 may provide a number of marketplace functions and services to users that access the networked system 1302. The payment applications 1322 may likewise provide a number of payment services and functions to users. The payment applications 1322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1320. While the marketplace and payment applications 1320 and 1322 are shown in FIG. 13 to both form part of the networked system 1302, it will be appreciated that, in alternative embodiments, the payment applications 1322 may form part of a payment service that is separate and distinct from the networked system 1302.

Further, while the system 1300 shown in FIG. 13 employs a client-server architecture, the present invention is of course not limited to such an architecture, and could equally well find application in embodiments of a distributed, or peer-to-peer, architecture system, for example. The various marketplace and payment applications 1320 and 1322 could also be implemented as standalone software programs, which do not necessarily have networking capabilities.

The web client 1306 accesses the various marketplace and payment applications 1320 and 1322 via the web interface supported by the web server 1316. Similarly, the programmatic client 1308 accesses the various services and functions provided by the marketplace and payment applications 1320 and 1322 via the programmatic interface provided by the API server 1314. The programmatic client 1308 may, for example, be a seller application (e.g., the TurboLister application developed by eBay Inc., of San Jose, Calif.) to enable sellers to author and manage listings on the networked system 1302 in an off-line manner, and to perform batch-mode communications between the programmatic client 1308 and the networked system 1302.

FIG. 13 also illustrates a third party application 1328, executing on a third party server machine 1330, as having programmatic access to the networked system 1302 via the programmatic interface provided by the API server 1314. For example, the third party application 1328 may, utilizing information retrieved from the networked system 1302, support one or more features or functions on a web site hosted by the third party. The third party web site may, for example, provide one or more promotional, marketplace or payment functions that are supported by the relevant applications of the networked system 1302.

Marketplace Applications

Figure 14:
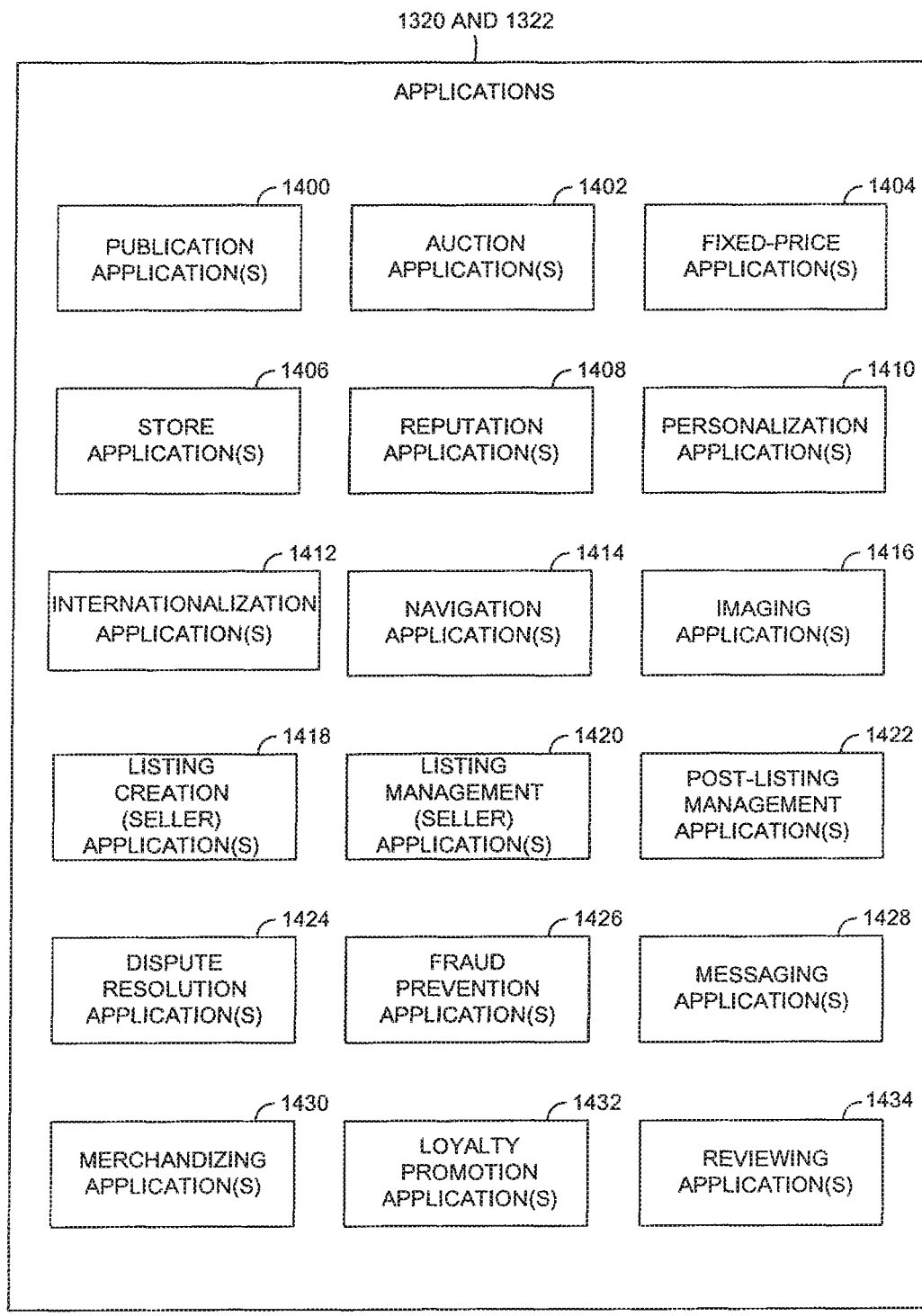
FIG. 14 is a block diagram illustrating multiple applications that, in one example embodiment, are provided as part of the networked system of FIG. 14.

FIG. 14 is a block diagram illustrating multiple applications 1320 and 1322 that, in one example embodiment, are provided as part of the networked system 1302. The applications 1320 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 1326 via the database servers 1324.

The networked system 1302 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1320 are shown to include at least one publication application 1400 and one or more auction applications 1402 which support auction-format listing and price setting mechanisms (e.g., English, Dutch, Vickrey, Chinese, Double, Reverse auctions etc.). The various auction applications 1402 may also provide a number of features in support of such auction-format listings, such as a reserve price feature whereby a seller may specify a reserve price in connection with a listing and a proxy-bidding feature whereby a bidder may invoke automated proxy bidding.

A number of fixed price applications 1404 support fixed price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed price that is typically higher than the starting price of the auction.

Store applications 1406 allow a seller to group listings within a "virtual" store, which may be branded and otherwise personalized by and for the seller. Such a virtual store may also offer promotions, incentives and features that are specific and personalized to a relevant seller.

Reputation applications 1408 allow users that transact, utilizing the networked system 1302, to establish, build and maintain reputations, which may be made available and published to potential trading partners. Consider that where, for example, the networked system 1302 supports person-to-person trading, users may otherwise have no history or other reference information whereby the trustworthiness and credibility of potential trading partners may be assessed. The reputation applications 1408 allow a user, for example through feedback provided by other transaction partners, to establish a reputation within the networked system 1302 over time. Other potential trading partners may then reference such a reputation for the purposes of assessing credibility and trustworthiness.

Personalization applications 1410 allow users of the networked system 1302 to personalize various aspects of their interactions with the networked system 1302. For example a user may, utilizing an appropriate personalization application 1410, create a personalized reference page at which information regarding transactions to which the user is (or has been) a party may be viewed. Further, a personalization application 1410 may enable a user to personalize listings and other aspects of their interactions with the networked system 1302 and other parties.

Embodiments of the networked system 1302 may support a number of marketplaces that are customized, for example, for specific geographic regions. A version of the networked system 1302 may be customized for the United Kingdom, whereas another version of the networked system 1302 may be customized for the United States. Each of these versions may operate as an independent marketplace, or may be customized (or internationalized) presentations of a common underlying marketplace. The networked system 1302 may accordingly include a number of internationalization applications 1412 that customize information (and/or the presentation of information) by the networked system 1302 according to predetermined criteria (e.g., geographic, demographic or marketplace criteria). For example, the internationalization applications 1412 may be used to support the customization of information for a number of regional web sites that are operated by the networked system 1302 and that are accessible via respective web servers 1316.

Navigation of the networked system 1302 may be facilitated by one or more navigation applications 1414. For example, a search application (as an example of a navigation application) may enable key word searches of listings published via the networked system 1302. A browse application may allow users to browse various category, catalogue, or inventory data structures according to which listings may be classified within the networked system 1302. Various other navigation applications may be provided to supplement the search and browsing applications.

In order to make listings, available via the networked system 1302, as visually informing and attractive as possible, the marketplace applications 1320 may include one or more imaging applications 1416 utilizing which users may upload images for inclusion within listings. An imaging application 1416 also operates to incorporate images within viewed listings. The imaging applications 1416 may also support one or more promotional features, such as image galleries that are presented to potential buyers. For example, sellers may pay an additional fee to have an image included within a gallery of images for promoted items.

Listing creation applications 1418 allow sellers to easily author listings pertaining to goods or services that they wish to transact via the networked system 1302. Listing management applications 1420 allow sellers to manage such product listings. Specifically, where a particular seller has authored and/or published a large number of listings, the management of such listings may present a challenge. The listing management applications 1420 provide a number of features (e.g., auto-relisting, inventory level monitors, etc.) to assist the seller in managing such listings. One or more post-listing management applications 1422 may also assist sellers with a number of activities that typically occur after creating a listing. For example, upon completion of an auction facilitated by one or more auction applications 1402, a seller may wish to leave feedback regarding a particular buyer. To this end, a post-listing management application 1422 may provide an interface to one or more reputation applications 1408, so as to allow the seller conveniently to provide feedback regarding multiple buyers to the reputation applications 1408.

Dispute resolution applications 1424 provide mechanisms whereby disputes arising between transacting parties may be resolved. For example, the dispute resolution applications 1424 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 1426 implement fraud detection and prevention mechanisms to reduce the occurrence of fraud within the networked system 1302.

Messaging applications 1428 (such as, for example, communication module 104) are responsible for the generation and delivery of messages to users of the networked system 1302, such messages for example advising users regarding the status of listings at the networked system 1302 (e.g., providing "outbid" notices to bidders during an auction process or to provide promotional and merchandising information to users). Respective messaging applications 1428 may utilize any one have a number of message delivery networks and platforms to deliver messages to users. For example, messaging applications 1428 may deliver electronic mail (email), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1430 support various merchandising functions that are made available to sellers to enable sellers to increase sales via the networked system 1302. The merchandising applications 1430 also operate the various merchandising features that may be invoked by sellers, and may monitor and track the success of merchandising strategies employed by sellers.

The networked system 1302 itself, or one or more parties that transact via the networked system 1302, may operate loyalty programs that are supported by one or more loyalty/promotions applications 1432. For example, a buyer may earn loyalty or promotions points for each transaction established and/or concluded with a particular seller, and be offered a reward for which accumulated loyalty points can be redeemed.

Example High-Level Data Structures

Figure 15:
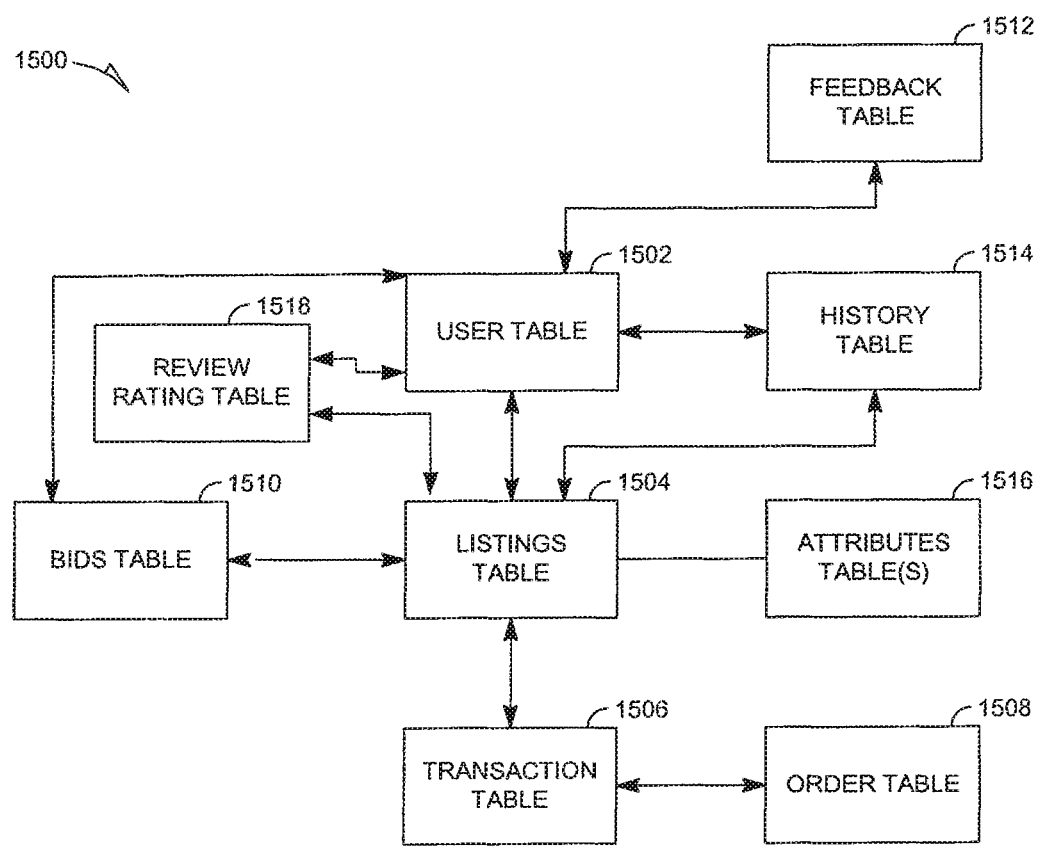
FIG. 15 is a high-level entity-relationship diagram, illustrating various tables that may be maintained within the databases of FIG. 14 and that are utilized by and support some applications illustrated in FIG. 14.

FIG. 15 is a high-level entity-relationship diagram, illustrating various database tables 1500 that may be maintained within the databases 1326, and that are utilized by and support the applications 1320 and 1322. A users table 1502 contains a record for each registered user of the networked system 1302, and may include identifier, address and financial instrument information pertaining to each such registered user. A user may operate as a seller, a buyer, or both, within the networked system 1302. In one example embodiment, a buyer may be a user that has accumulated value (e.g., commercial or proprietary currency), and is accordingly able to exchange the accumulated value for items that are offered for sale by the networked system 1302.

The database tables 1500 also include an items table 1504 in which are maintained item records for goods and services that are available to be, or have been, transacted via the networked system 1302. Each item record within the items table 1504 may furthermore be linked to one or more user records within the users table 1502, so as to associate a seller and one or more actual or potential buyers with each item record.

A transaction table 1506 contains a record for each transaction (e.g., a purchase or sale transaction) pertaining to items for which records exist within the items table 1504.

An order table 1508 is populated with order records, each order record being associated with an order. Each order, in turn, may be with respect to one or more transactions for which records exist within the transaction table 1506.

Bid records within a bids table 1510 each relate to a bid received at the networked system 1302 in connection with an auction-format listing supported by an auction application 1402. A feedback table 1512 is utilized by one or more reputation applications 1408, in one example embodiment, to construct and maintain reputation information concerning users. A history table 1514 maintains a history of transactions to which a user has been a party. One or more attributes tables 1516 record attribute information pertaining to items for which records exist within the items table 1504. Considering only a single example of such an attribute, the attributes tables 1516 may indicate a currency attribute associated with a particular item, the currency attribute identifying the currency of a price for the relevant item as specified in by a seller.

Figure 16:
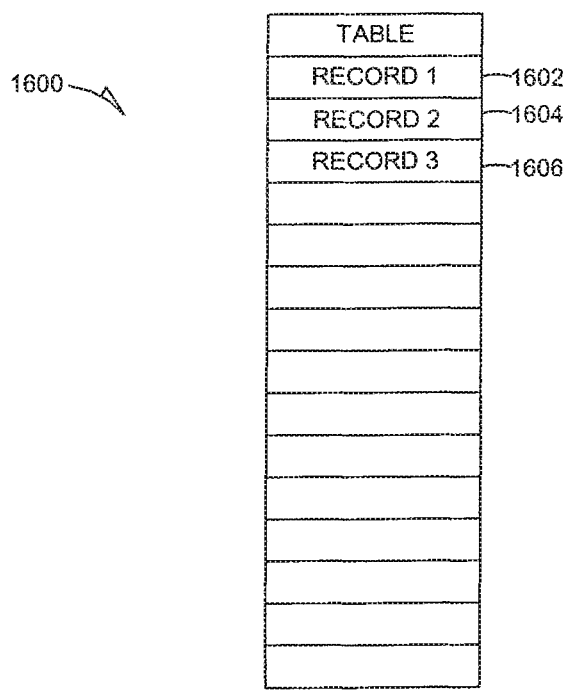
FIG. 16 provides further details regarding pertinent tables that are shown in FIG. 15.

In addition, in some embodiments, a review rating table 1518, as described in detail above, may also be maintained within the databases 1326. FIG. 16 provides further details regarding tables that are shown in FIG. 15 to be maintained within the databases 1326. Specifically, FIG. 16 illustrates that each table 1600 is made up of multiple records such as records 1602, 1604, and 1606.

Example Computer Systems for Carrying Out Operations

Figure 17:
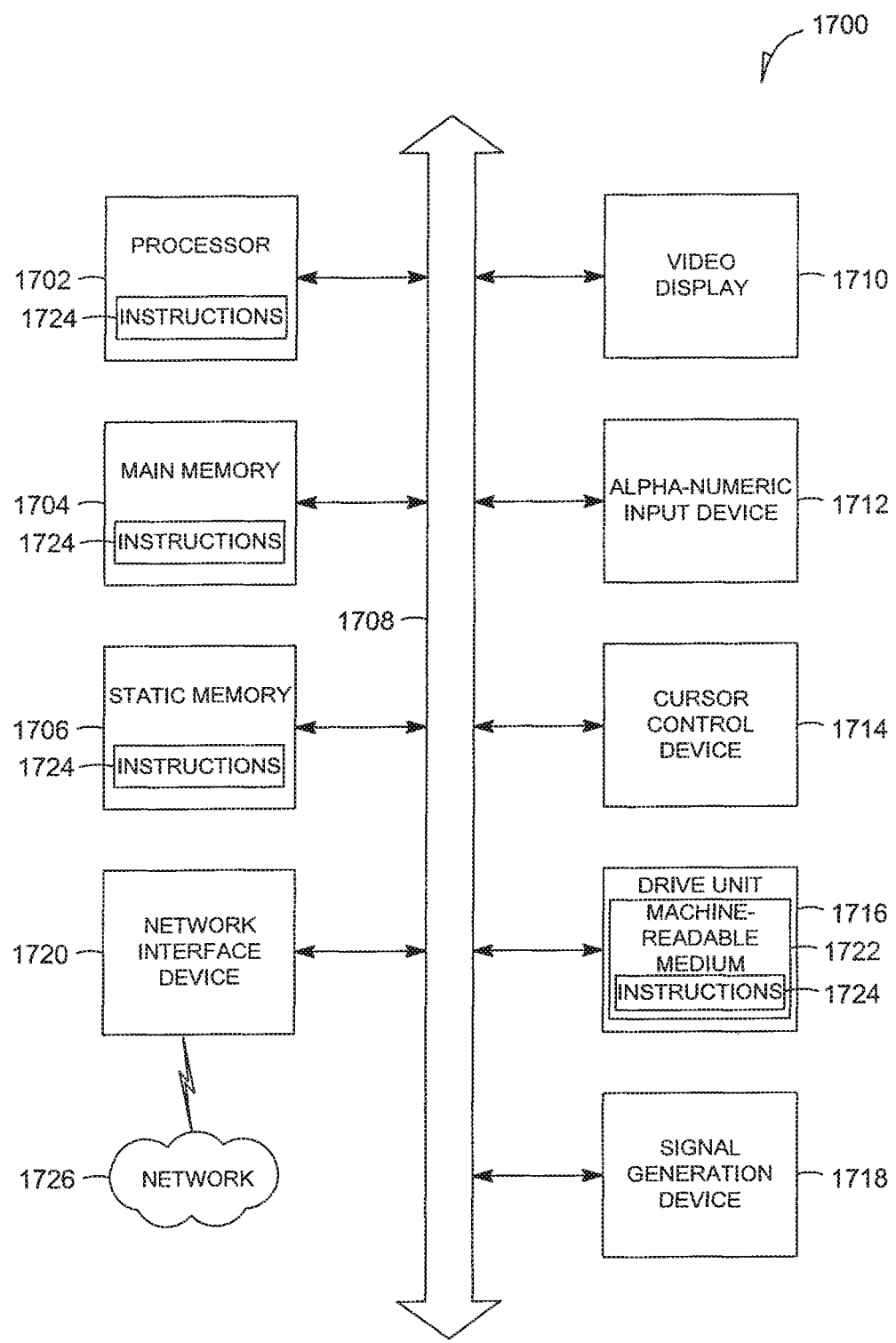
FIG. 17 shows a diagrammatic representation of machine in the example form of a computer system within which a set of instructions, for causing the machine to perform any one or more of the methodologies, processes, or operations discussed herein, may be executed.

FIG. 17 shows a diagrammatic representation of machine in the example form of a computer system 1700 within which a set of instructions, for causing the machine to perform any one or more of the methodologies, processes, or operations discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU) a graphics processing unit (GPU) or both), a main memory 1704 and a static memory 1706, which communicate with each other via a bus 1708. The computer system 1700 may further include a video display unit 1710 (e.g., a Liquid Crystal Display (LCD) or a Cathode Ray Tube (CRT)). The computer system 1700 also includes an alphanumeric input device 1712 (e.g., a keyboard), a cursor control device 1714 (e.g., a mouse), a disk drive unit 1716, a signal generation device 1718 (e.g., a speaker) and a network interface device 1720.

The disk drive unit 1716 includes a machine-readable medium 1722 on which is stored one or more sets of instructions (e.g., software 1724) embodying any one or more of the methodologies or functions described herein. The software 1724 may also reside, completely or at least partially, within the main memory 1704 and/or within the processor 1702 during execution thereof by the computer system 1700, the main memory 1704 and the processor 1702 also constituting machine-readable media.

The software 1724 may further be transmitted or received over a network 1726 via the network interface device 1720.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical, and magnetic media.

Thus, a method and system for automatic sequential review elicitation have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more computer processors;
   one or more computer memories;
   one or more modules of an automatic sequential review elicitation system incorporated into the one or more computer memories, the one or more modules configuring the one or more computer processors to perform operations for more quickly gathering review information, the operations comprising:
   in response to receiving a selection of a user interface mechanism corresponding to a first evaluation indication, the first evaluation indication including an opinion of a first user with respect to a first publication, automatically initiating a secondary evaluation process of the automatic sequential review elicitation system, the secondary evaluation process comprising:
      communicating a set of additional publications for presentation in a submission confirmation window;
      receiving, via the submission confirmation window, a selection of a second publication from the set of additional publications;
      eliciting a second evaluation indication, via an evaluation submission window of the user interface, the second evaluation indication including an opinion of the first user with respect to the second publication, selection of a user interface mechanism corresponding to the second evaluation allowing the first user to review, rate, rank, or comment upon the second publication, the user interface mechanism corresponding to the second evaluation indication including a button, checkbox, or other graphical user interface mechanism; and communicating the first evaluation indication and the second evaluation indication for use by the network-based publication system in removing the first publication or the second publication as an objectionable publication.

2. The system of claim 1, the operations further comprising combining the first evaluation indication with a third evaluation indication to produce a composite evaluation measurement and to associate the composite evaluation measurement with the first publication, the third evaluation indication including an opinion of a second user with respect to a propriety of the first publication for presentation to other users.

3. The system of claim 1, the further comprising determining a trustworthiness of the first user based on an analysis of the first evaluation indication and crediting the first user with a reward that is commensurate with the trustworthiness.

4. The system of claim 1, wherein the first publication is a designation of a listing by another user as featuring a counterfeit item and the opinion of the first user is that the listing does not feature a counterfeit item.

5. The system of claim 1, wherein the first publication is a designation of a listing by another user featuring a counterfeit item and the first evaluation indication includes a reason why the listing features the counterfeit item.

6. The system of claim 1, wherein the first publication includes an intentional misrepresentation of the first publication to test an accuracy of the first evaluation indication.

7. A method comprising:
incorporating one or more modules of an automatic sequential review elicitation system into a network-based publication system, the one or more modules configuring one or more computer processors of the network-based publication system to perform operations for more quickly gathering review information, the operations comprising:
in response to receiving a selection of a user interface mechanism corresponding to a first evaluation indication, the first evaluation indication including an opinion of a first user with respect to a first publication, automatically initiating a secondary evaluation process of the automatic sequential review elicitation system, the secondary evaluation process comprising:
communicating a set of additional publications for presentation in a submission confirmation window;
receiving, via the submission confirmation window, a selection of a second publication from the set of additional publications;
eliciting a second evaluation indication, via an evaluation submission window of the user interface, the second evaluation indication including an opinion of the first user with respect to the second publication, selection of a user interface mechanism corresponding to the second evaluation allowing the first user to review, rate, rank, or comment upon the second publication, the user interface mechanism corresponding to the second evaluation indication including a button, checkbox, or other graphical user interface mechanism; and
communicating the first evaluation indication and the second evaluation indication for use by the network-based publication system in removing the first publication or the second publication as an objectionable publication.

8. The method of claim 7, the operations further comprising combining the first evaluation indication with a third evaluation indication to produce a composite evaluation measurement and associating the composite evaluation measurement with the first publication, the third evaluation indication including an opinion of a second user with respect to a propriety of the first publication for presentation to other users.

9. The method of claim 7, the operations further comprising determining a trustworthiness of the first user based on an analysis of the first evaluation indication and credit the first user with a reward that is commensurate with the trustworthiness.

10. The method of claim 7, wherein the first publication is a designation of a listing by another user as featuring a counterfeit item and the opinion of the first user is that the listing does not feature a counterfeit item.

11. The method of claim 7, wherein the first publication is a designation of a listing by another user as featuring a counterfeit item and the first evaluation indication includes a reason why the listing features the counterfeit item.

12. The method of claim 7, wherein the first publication includes an intentional misrepresentation of the first publication to test an accuracy of the first evaluation indication.

13. A non-transitory machine-readable medium storing processor-executable instructions that, when executed by one or more computer processors, cause the one or more computer processors of an automatic sequential review elicitation system to perform operations for more quickly gathering review information, the operations comprising:
in response to receiving a selection of a user interface mechanism corresponding to a first evaluation indication, the first evaluation indication including an opinion of a first user with respect to a first publication, automatically initiating a secondary evaluation process of the automatic sequential review elicitation system, the secondary evaluation process comprising:
communicating a set of additional publications for presentation in a submission confirmation window;
receiving, via the submission confirmation window, a selection of a second publication from the set of additional publications;
eliciting a second evaluation indication, via an evaluation submission window of the user interface, the second evaluation indication including an opinion of the first user with respect to the second publication, selection of a user interface mechanism corresponding to the second evaluation allowing the first user to review, rate, rank, or comment upon the second publication, the user interface mechanism corresponding to the second evaluation indication including a button, checkbox, or other graphical user interface mechanism; and
communicating the first evaluation indication and the second evaluation indication for use by the network-based publication system in removing the first publication or the second publication as an objectionable publication.

14. The non-transitory machine-readable medium of claim 13, the operations further comprising combining the first evaluation indication with a third evaluation indication to produce a composite evaluation measurement and associating the composite evaluation measurement with the first publication, the third evaluation indication including an opinion of a second user with respect to a propriety of the first publication for presentation to other users.

15. The non-transitory machine-readable medium of claim 13, the operations further comprising determining a trustworthiness of the first user based on an analysis of the first evaluation indication and credit the first user with a reward that is commensurate with the trustworthiness.

16. The non-transitory machine-readable medium of claim 13, wherein the first publication is a designation of a listing by another user as featuring a counterfeit item and the opinion of the first user is that the listing does not feature a counterfeit item.

17. The non-transitory machine-readable medium of claim 13, wherein the first publication is a designation of a listing by another user as featuring a counterfeit item and the first evaluation indication includes a reason why the listing features the counterfeit item.

* * * * *